(12) United States Patent
Yokoyama et al.

(10) Patent No.: US 11,834,032 B2
(45) Date of Patent: Dec. 5, 2023

(54) VEHICLE CONTROL DEVICE AND VEHICLE CONTROL METHOD

(71) Applicant: TOYOTA JIDOSHA KABUSHIKI KAISHA, Toyota (JP)

(72) Inventors: Daiki Yokoyama, Gotemba (JP); Hiroya Chiba, Susono (JP); Yoshiyuki Kageura, Sunto-gun (JP); Masanori Shimada, Susono (JP); Yoshihiro Sakayanagi, Mishima (JP); Sui Kurihashi, Sunto-gun (JP); Hiroki Morita, Hiratsuka (JP); Makoto Ogiso, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 136 days.

(21) Appl. No.: 17/457,759

(22) Filed: Dec. 6, 2021

(65) Prior Publication Data

US 2022/0234567 A1 Jul. 28, 2022

(30) Foreign Application Priority Data

Jan. 22, 2021 (JP) ................................. 2021-008943

(51) Int. Cl.
*B60W 20/12* (2016.01)
*B60W 20/16* (2016.01)
(Continued)

(52) U.S. Cl.
CPC ............. *B60W 20/12* (2016.01); *B60L 53/51* (2019.02); *B60W 10/06* (2013.01); *B60W 10/08* (2013.01);
(Continued)

(58) Field of Classification Search
CPC ...... B60W 20/12; B60W 10/06; B60W 10/08; B60W 20/13; B60W 20/16;
(Continued)

(56) References Cited

U.S. PATENT DOCUMENTS 5,815,824 A * 9/1998 Saga .................... B60W 20/00
180/65.245
6,166,449 A * 12/2000 Takaoka .................... B60L 7/14
290/40 C
(Continued)

FOREIGN PATENT DOCUMENTS

DE 10 2010 039 653 A1 2/2012
DE 10 2018 209 453 A1 12/2019
(Continued)

*Primary Examiner* — Sizo B Vilakazi
*Assistant Examiner* — Brian R Kirby
(74) *Attorney, Agent, or Firm* — Oblon, McClelland, Maier & Neustadt, L.L.P.

(57) ABSTRACT

A vehicle control device including processor being configured to, when driving sections are present inside a restricted region, extract as a restricted driving section from among driving sections present inside the restricted region a driving section through which it is projected the vehicle will be driven in a restricted time period in which operation of internal combustion engines is restricted, and prepare a driving plan able to drive through the restricted driving section in the EV mode.

20 Claims, 22 Drawing Sheets

(51) Int. Cl.
*B60L 53/51* (2019.01)
*B60W 10/06* (2006.01)
*B60W 10/08* (2006.01)
*G01C 21/34* (2006.01)
*B60W 20/13* (2016.01)
*B60K 6/24* (2007.10)

(52) U.S. Cl.
CPC .............. *B60W 20/13* (2016.01); *B60W 20/16* (2016.01); *G01C 21/343* (2013.01); *G01C 21/3415* (2013.01); *G01C 21/3469* (2013.01); *B60K 6/24* (2013.01); *B60W 2510/244* (2013.01); *B60W 2555/20* (2020.02)

(58) Field of Classification Search
CPC ....... B60W 2510/244; B60W 2555/20; B60W 2555/60; B60W 2556/50; B60W 2710/244; B60W 2050/146; B60W 2556/10; B60W 50/14; B60W 20/14; B60W 20/20; B60W 30/18127; B60W 50/0097; B60W 20/40; B60W 20/10; B60L 53/51; B60L 8/003; B60L 2240/12; B60L 2240/622; B60L 2240/662; B60L 2240/667; B60L 2240/72; B60L 2250/12; B60L 2250/16; B60L 2260/54; B60L 7/10; B60L 50/16; B60L 50/60; B60L 53/305; B60L 58/12; G01C 21/3415; G01C 21/343; G01C 21/3469; B60K 6/24; B60K 2370/166; B60K 2370/169; B60K 35/00; B60K 6/445; B60Y 2400/214; B60Y 2400/216
USPC .......................................................... 701/22
See application file for complete search history.

(56) References Cited

U.S. PATENT DOCUMENTS

| | | | | |
|---|---|---|---|---|
| 6,439,192 | B1* | 8/2002 | Ouellette | F02D 19/0694 123/299 |
| 7,222,004 | B2* | 5/2007 | Anderson | G01C 21/3461 180/65.265 |
| 7,665,559 | B2* | 2/2010 | De La Torre-Bueno | B60K 6/46 701/25 |
| 8,285,433 | B2* | 10/2012 | Ang | B60W 20/12 701/22 |
| 9,193,268 | B2* | 11/2015 | Kumar | B60L 15/2045 |
| 9,821,790 | B2 | 11/2017 | Jones | |
| 2003/0015358 | A1* | 1/2003 | Abe | B60W 50/0097 903/918 |
| 2003/0015874 | A1* | 1/2003 | Abe | B60W 20/12 290/40 C |
| 2003/0078707 | A1 | 4/2003 | Shioda et al. | |
| 2004/0062963 | A1* | 4/2004 | Umayahara | B60L 58/30 429/429 |
| 2005/0251299 | A1* | 11/2005 | Donnelly | B60L 15/20 701/19 |
| 2006/0101823 | A1* | 5/2006 | Takemoto | B60W 20/10 477/3 |
| 2006/0173593 | A1* | 8/2006 | Anderson | F02N 11/0833 701/1 |
| 2009/0101421 | A1* | 4/2009 | Oyobe | B60L 53/14 180/65.265 |
| 2009/0326748 | A1* | 12/2009 | Frese | B60K 6/48 180/65.21 |
| 2010/0235016 | A1* | 9/2010 | Grider | B60W 10/06 701/2 |
| 2010/0274422 | A1* | 10/2010 | Schrey | G01C 21/3461 903/903 |
| 2011/0022260 | A1* | 1/2011 | Ichikawa | B60W 20/00 903/903 |
| 2012/0290149 | A1* | 11/2012 | Kristinsson | B60W 10/08 701/2 |
| 2013/0204456 | A1* | 8/2013 | Tippelhofer | B60L 53/00 701/1 |
| 2013/0226441 | A1* | 8/2013 | Horita | B60Q 9/00 701/117 |
| 2013/0268150 | A1* | 10/2013 | Weslati | B60W 10/26 701/1 |
| 2014/0288742 | A1* | 9/2014 | Hokoi | B60W 20/14 180/65.265 |
| 2015/0115055 | A1* | 4/2015 | Wager | F02M 43/04 239/584 |
| 2015/0291145 | A1* | 10/2015 | Yu | B60W 20/13 180/65.23 |
| 2015/0377153 | A1* | 12/2015 | Gallagher | F02D 29/02 123/575 |
| 2017/0232952 | A1* | 8/2017 | Blasinski | B60K 6/48 701/22 |
| 2019/0126907 | A1* | 5/2019 | Park | B60W 20/16 |
| 2019/0143821 | A1* | 5/2019 | Bell | B60W 10/08 180/65.225 |
| 2019/0178660 | A1* | 6/2019 | Greenberg | G01C 21/3461 |
| 2019/0270443 | A1* | 9/2019 | Kurihashi | B60W 20/12 |
| 2019/0377365 | A1* | 12/2019 | Terahata | G06Q 20/14 |
| 2020/0180599 | A1* | 6/2020 | Kang | B60K 6/442 |

FOREIGN PATENT DOCUMENTS

| | | | |
|---|---|---|---|
| EP | 2 689 982 A1 | 1/2014 | |
| JP | 2003-32803 A | 1/2003 | |
| JP | 2003-111208 A | 4/2003 | |
| JP | 2004-156622 A | 6/2004 | |
| JP | 2008-101506 A | 5/2008 | |
| JP | 2009-207327 A | 9/2009 | |
| JP | 2014-213638 A | 11/2014 | |
| JP | 2015-214262 A | 12/2015 | |
| JP | 2019-151316 A | 9/2019 | |
| JP | 2020-171077 A | 10/2020 | |
| KR | 20080053717 A | * 6/2008 | ............ H01M 50/20 |

* cited by examiner

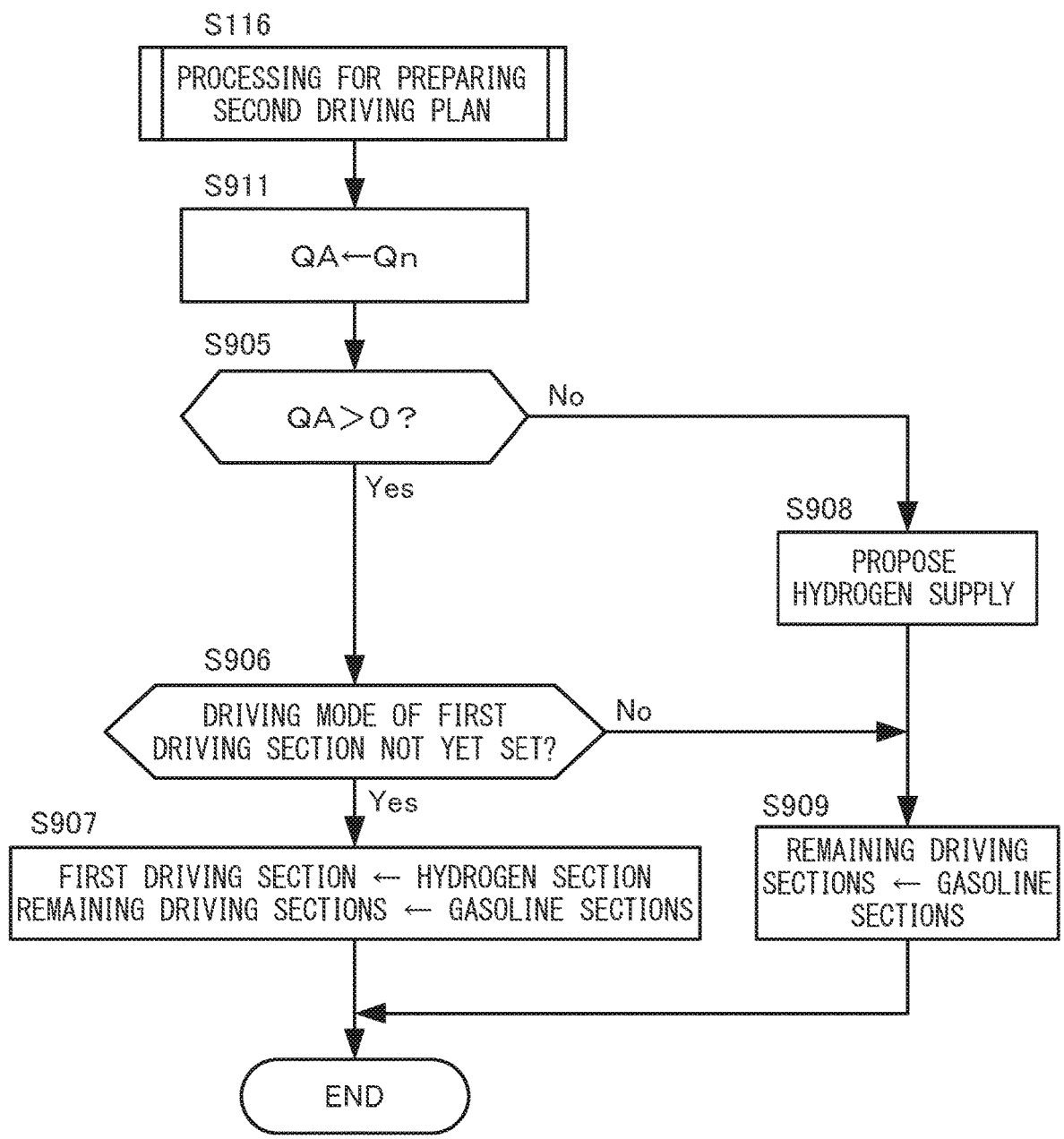

VEHICLE CONTROL DEVICE AND VEHICLE CONTROL METHOD

FIELD

The present disclosure relates to a vehicle control device and vehicle control method.

BACKGROUND

Japanese Unexamined Patent Publication No. 2019-151316 discloses a conventional control device of a vehicle configured so as to prepare a driving plan dividing a projected route from a starting point to a destination into a plurality of sections and classifying the sections into EV sections for driving in the EV mode and HV sections for driving in the HV mode.

SUMMARY

In recent years, from the viewpoint of prevention of air pollution, from the viewpoint of noise prevention, and from other viewpoints, an increasing number of countries have established restricted regions restricting operation of internal combustion engines. Inside a restricted region, operation of internal combustion engines is restricted, so, for example, in the case of a hybrid vehicle, inside a restricted region, it is basically necessary to drive in the EV mode. However, conventional control devices of vehicles explained above have prepared driving plans without considering such restricted regions. For this reason, they were liable to end up preparing driving plans running through the insides of restricted regions in the HV mode and as a result driving as in the driving plan was liable to become impossible.

The present disclosure was made focusing on such a problem and has as its object to prepare a suitable driving plan considering restricted regions.

To solve the above problem, according to one aspect of the present disclosure, there is provided a vehicle control device for controlling a vehicle equipped with an internal combustion engine, rotating electric machine, and battery. The vehicle control device according to this aspect is provided with a driving plan preparation part for preparing a driving plan dividing a scheduled driving route up to a destination of the vehicle into a plurality of driving sections and setting which driving mode the driving sections should be driven in between an EV mode stopping the operation of the internal combustion engine and driving by the drive power of the rotating electric machine and an HV mode running by drive power of the internal combustion engine and the drive power of the rotating electric machine and a drive power control part for controlling the internal combustion engine and rotating electric machine based on the driving plan, the driving plan preparation part configured so that, when driving sections are present inside a restricted region, it extracts as a restricted driving section from among driving sections present inside the restricted region a driving section through which it is projected the vehicle will be driven in a restricted time period in which operation of internal combustion engines is restricted and prepares a driving plan able to drive through the restricted driving section in the EV mode.

Further, according to another aspect of the present disclosure, there is provided a vehicle control device for controlling a vehicle equipped with an internal combustion engine configured to be able to burn hydrogen fuel in part of the cylinders and able to burn a fossil fuel in the remaining cylinders. The vehicle control device according to the present aspect comprises a driving plan preparation part for preparing a driving plan dividing a scheduled driving route up to a destination of the vehicle into a plurality of driving sections and setting which driving mode the driving sections should be driven in between a first mode running by burning only hydrogen fuel or a second mode running by burning at least fossil fuel and a drive power control part for controlling the internal combustion engine based on the driving plan, the driving plan preparation part configured so that, when driving sections are present inside a restricted region, it extracts as a restricted driving section from among driving sections present inside the restricted region a driving section through which it is projected that the vehicle will be driven in a restricted time period in which burning fossil fuel to operate internal combustion engines is restricted and prepares a driving plan able to drive through the restricted driving section in the first mode.

Further, according to another aspect of the present disclosure, there is provided a vehicle control method for controlling a vehicle equipped with an internal combustion engine, rotating electric machine, and battery. The vehicle control method according to the present aspect includes a step of dividing a scheduled driving route up to a destination of the vehicle into a plurality of driving sections and setting which driving mode the driving sections should be driven in between an EV mode stopping the operation of the internal combustion engine and driving by the drive power of the rotating electric machine and an HV mode running by drive power of the internal combustion engine and the drive power of the rotating electric machine. This step further includes a step of judging if driving sections are present inside a restricted region, a step where, when driving sections are present inside a restricted region, it extracts as a restricted driving section from among driving sections present inside the restricted region a driving section through which it is projected the vehicle will be driven in a restricted time period in which operation of internal combustion engines is restricted, and a step of setting the driving mode of the restricted driving section to the EV mode.

According to these aspects of the present disclosure, it is possible to prepare a suitable driving plan considering restricted regions.

BRIEF DESCRIPTION OF DRAWINGS

FIG. 19B is a flow chart explaining processing for preparation of a second driving plan according to the ninth embodiment of the present disclosure.

DESCRIPTION OF EMBODIMENTS

Figure 1:
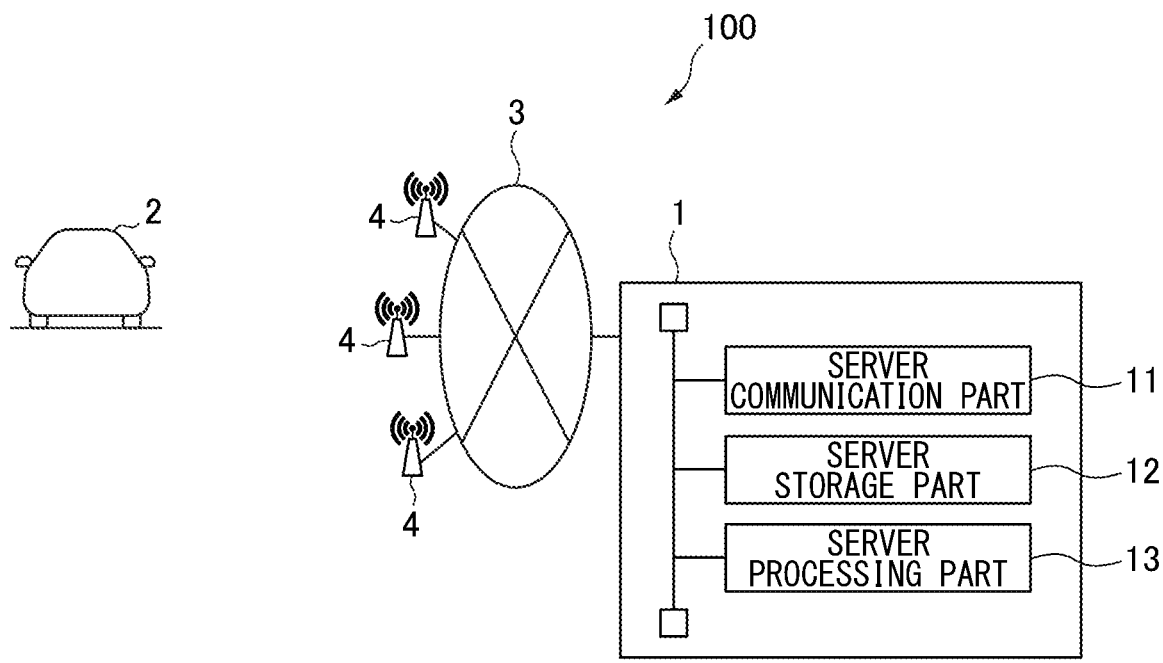
FIG. 1 is a schematic view of the configuration of a vehicle control system according to a first embodiment of the present disclosure.

Below, embodiments of the present disclosure will be explained in detail with reference to the drawings. Note that, in the following explanation, similar component elements will be assigned the same reference numerals.

First Embodiment

FIG. 1 is a schematic view of the configuration of a vehicle control system 100 according to a first embodiment of the present disclosure.

As shown in FIG. 1, the vehicle control system 100 according to the present embodiment is provided with a server 1 and a vehicle 2.

The server 1 is provided with a server communication part 11, server storage part 12, and server processing part 13.

The server communication part 11 has a communication interface circuit for connecting the server 1 through for example a gateway etc. to a network 3 and is configured to be able to communicate with the vehicle 2.

The server storage part 12 has an HDD (hard disk drive), optical recording medium, semiconductor memory, or other storage medium and stores the various types of computer programs and data etc. used for the processing at the server processing part 13.

In the present embodiment, the server storage part 12 stores at least information relating to restricted regions established at different places in a country (information relating to later explained boundaries GF or restricted time periods etc.). A "restricted region" is a region in which operation of internal combustion engines is restricted from the viewpoint of prevention of air pollution, the viewpoint of noise prevention, or other viewpoints. If simply explaining a restricted region while referring to FIG. 2, FIG. 2 shows the boundary GF between the inside and outside of the restricted region and road positions Kd, Ke, Kf, Kg on the boundary GF.

Figure 2:
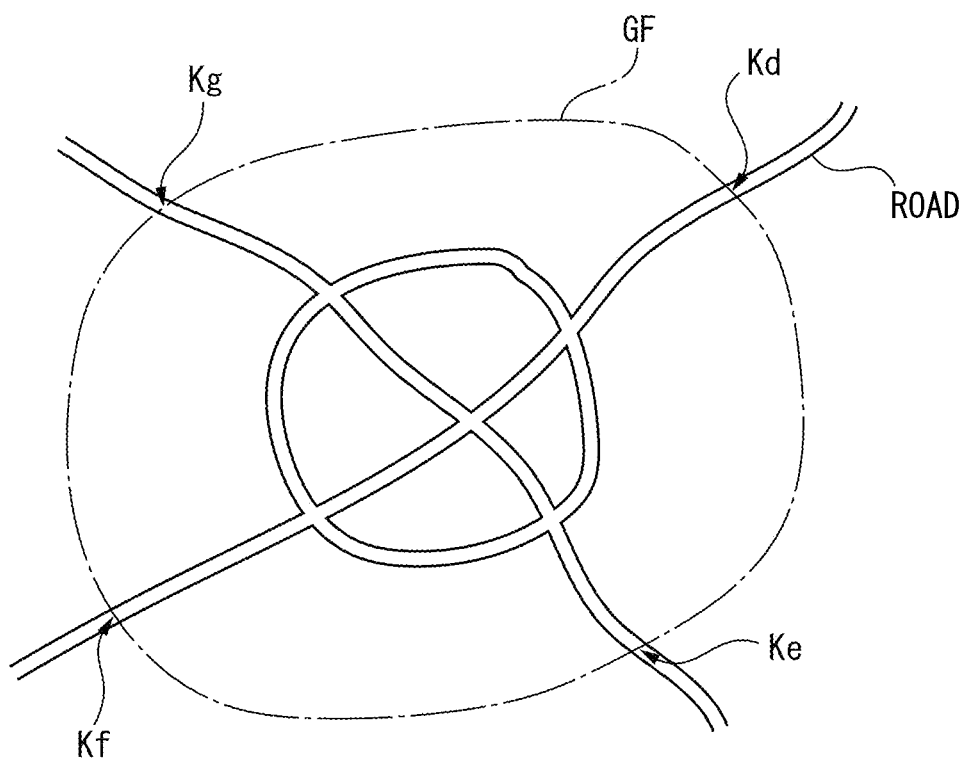
FIG. 2 is a view explaining a restricted region.

In FIG. 2, the inside of the boundary GF is the restricted region. If this restricted region is for example a restricted region of a variable time period type established only for a predetermined restricted time period, operation of internal combustion engines inside the restricted region is restricted for only the restricted time period while operation of internal combustion engines is allowed in the nonrestricted time period. The restricted time period is, for example, set in units of hours, days, weeks, months, years, days of the week, etc. On the other hand, if the restricted region shown in FIG. 2 is a fixed type restricted region in which no restricted time period is particularly established, operation of internal combustion engines is restricted at all times inside the restricted region.

At the road positions Kd, Ke, Kf, Kg on the boundary GF, for example, gates are provided. In the present embodiment, if the vehicle 2 passes through a gate and enters inside a restricted region, a signal notifying the vehicle 2 that it has entered the restricted region from the gate is sent. Further, if the vehicle 2 receives this signal and recognizes that the host vehicle has entered inside the restricted region, it automatically restricts operation of the internal combustion engine mounted in the host vehicle (for example, if the vehicle 2 is a hybrid vehicle, the driving mode is automatically made the EV mode).

Returning to FIG. 1, the server processing part 13 has one or more processors and their peripheral circuits. The server processing part 13 runs various computer programs stored in the server storage part 12 and comprehensively controls the overall operation of the server 1 and is, for example, a CPU (central processing unit).

Figure 3:
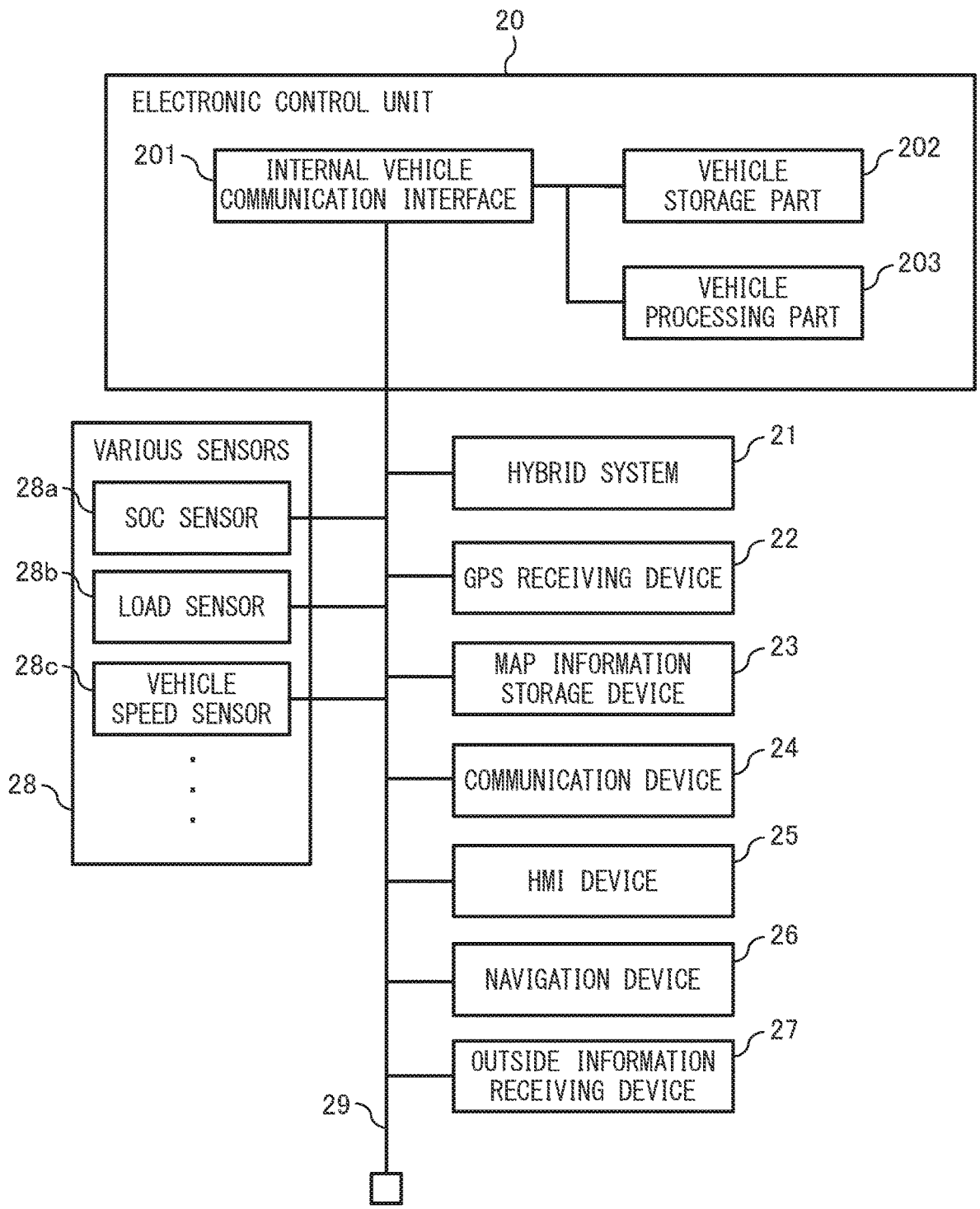
FIG. 3 is a schematic view of the configuration of a vehicle according to the first embodiment of the present disclosure.

FIG. 3 is a schematic view of the configuration of the vehicle 2.

The vehicle 2 according to the present embodiment is a hybrid vehicle which is, as shown in FIG. 3, provided with an electronic control unit 20, hybrid system 21, GPS receiving device 22, map information storage device 23, communication device 24, HMI (human machine interface) device 25, navigation device 26, outside information receiving device 27 and an SOC sensor 28a or load sensor 28b, vehicle speed sensor 28c, and other various sensors 28. The hybrid system 21, GPS receiving device 22, map information storage device 23, communication device 24, HMI device 25, navigation device 26, outside information receiving device 27, and various sensors 28 are connected with the electronic control unit 20 through an internal vehicle network 29 based on the CAN (Controller Area Network) or other standard.

The hybrid system 21 is configured to be able to generate the drive power necessary for making the vehicle 2 run and transmit that drive power to the driving wheels. Details of the hybrid system 21 will be explained with reference to FIG. 4.

Figure 4:
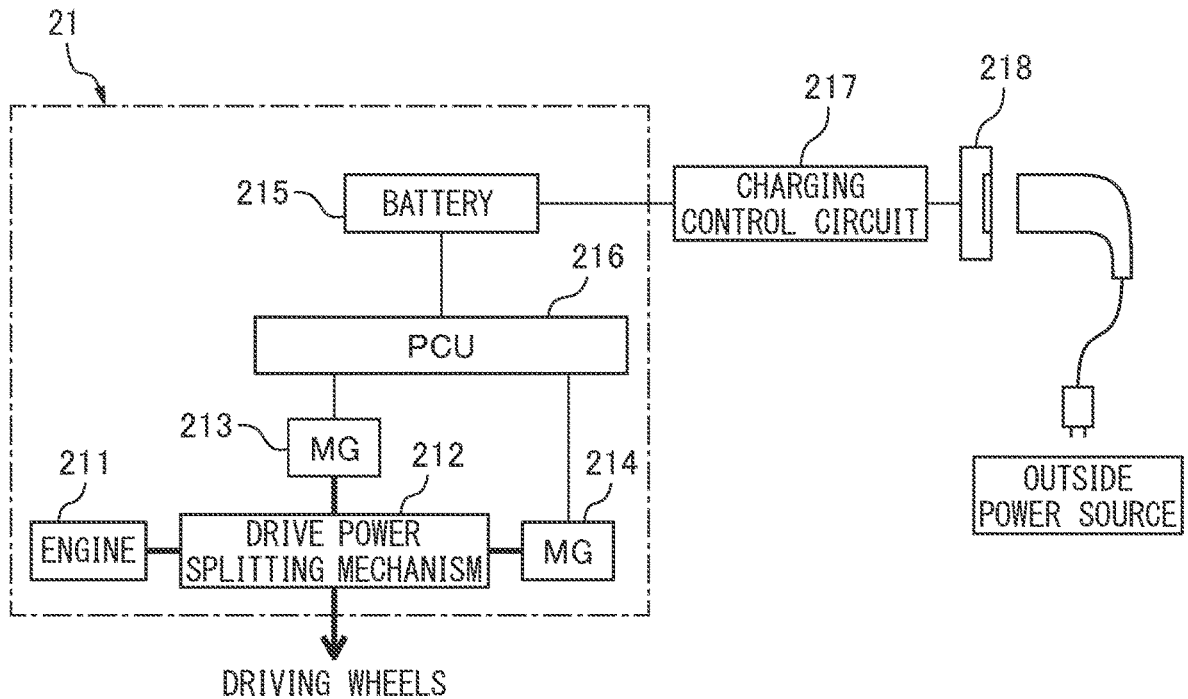
FIG. 4 is a schematic view of the configuration of a hybrid system.

FIG. 4 is a schematic view of the configuration of the hybrid system 21 according to the present embodiment. The hybrid system 21 according to the present embodiment is a so-called series-parallel type of hybrid system, but may also be a series type, parallel type, or other type of hybrid system.

As shown in FIG. 4, the hybrid system 21 according to the present embodiment is provided with an internal combustion engine 211, drive power splitting mechanism 212, first rotating electric machine 213 used mainly as a generator, second rotating electric machine 214 used mainly as a motor, battery 215, and power control unit (below, referred to as a "PCU") 216.

The internal combustion engine 211 burns fuel inside the cylinders formed at the inside and generates drive power for making an engine output shaft coupled with the drive power splitting mechanism 212 rotate. Note that, the internal combustion engine 211 according to the present embodiment is a gasoline engine burning gasoline fuel to generate drive power.

The drive power splitting mechanism 212 is a known planetary gear mechanism dividing the drive power of the internal combustion engine 211 into the two systems of drive power for making the driving wheels turn and drive power for driving regenerative operation of the first rotating electric machine 213.

The first rotating electric machine 213 is, for example, a three-phase alternating current synchronous type of motor-generator and has a function as a motor receiving the supply of electric power from the battery 215 to drive a power operation and a function as a generator receiving drive power of the internal combustion engine 211 to drive a regenerative operation. In the present embodiment, the first rotating electric machine 213 is mainly used as a generator and generates the electric power required for charging the battery 215 and the electric power required for driving regenerative operation of the second rotating electric machine 214. Further, it is used as a motor when making the engine output shaft rotate for cranking at the time of startup of the internal combustion engine 211 and performs the role of a starter.

The second rotating electric machine 214 is, for example, a three-phase alternating current synchronous type of motor-generator and has a function as a motor receiving the supply of electric power from the battery 215 to drive a power operation and a function as a generator receiving drive power from the driving wheels to drive a regenerative operation at the time of deceleration of the vehicle 2. In the present embodiment, the second rotating electric machine 214 is mainly used as a motor and generates the drive power for making the driving wheels rotate.

The battery 215 is, for example, a nickel cadmium storage battery or nickel hydrogen storage battery, lithium ion battery, or other rechargeable secondary battery. The battery 215 is electrically connected through the PCU 216 to the first rotating electric machine 213 and the second rotating electric machine 214 so as to be able to supply the charged electric power of the battery 215 to the first rotating electric machine 213 and the second rotating electric machine 214 to drive a power operation and, further, so as to be able to charge the battery 215 with generated electric power of the first rotating electric machine 213 and the second rotating electric machine 214.

Further, the battery 215 according to the present embodiment is configured to be able to be electrically connected at the home or a charging station etc. through a charging control circuit 217 and charging lid 218 to an outside power source so as to enable charging from the outside power source. The charging control circuit 217 is an electrical circuit which can convert the alternating current supplied from the outside power source to a direct current and boost the input voltage to the battery voltage to charge the electric power of the outside power source at the battery 215 based on control signals from the electronic control unit 20.

The PCU 216 is provided with an inverter and boost converter and is controlled in operation by the electronic control unit 20. Specifically, when the rotating electric machines 213 and 214 are used as motors, the operation of the PCU 216 is controlled by the electronic control unit 20 so that the electric power required for driving the rotating electric machines 213 and 214 is supplied from the battery 215 to the rotating electric machines 213 and 214. Further, when using the rotating electric machines 213 and 214 as generators, the operation of the PCU 216 is controlled by the electronic control unit 20 so that the electric power generated by the rotating electric machines 213 and 214 is supplied to the battery 215.

Returning to FIG. 3, the GPS receiving device 22 receives radio waves from satellites to identify the latitude and longitude of the hybrid vehicle 2 and detect the current position of the vehicle 2.

The map information storage device 23 stores position information of the roads, information on the road shapes (for example, the road grades, curves or straight sections, curvature of curves, etc.), position information of intersections and branch points, road types, speed limits, and other map information.

The communication device 24 is a vehicle-mounted terminal having a wireless communication function. The communication device 24 accesses a wireless base station 4 (see FIG. 1) connected with a network 3 (see FIG. 1) through a not shown gateway etc. to be connected through the wireless base station 4 with the network 3. Due to this, two-way communication with the server 1 is performed.

The HMI device 25 is an interface for transfer of information with the vehicle occupants. The HMI device 25 according to the present embodiment is provided with a display and speaker for providing the vehicle occupants with various types of information and a touch panel for a vehicle occupant to operate to enter information. The HMI device 25 sends the input information which was inputted by the vehicle occupant (for example, the destination, waypoints, and other information) to the electronic control unit 20 and the navigation device 26. Further, when receiving various types of information from the electronic control unit 20 or navigation device 26, outside information receiving device 27, etc., the HMI device 25 displays the received information on the display etc. to provide it to the vehicle occupants.

The navigation device 26 is a device guiding the vehicle 2 until a destination set by a vehicle occupant through the HMI device 25. The navigation device 26 sets the scheduled driving route from the current position to the destination based on the current position information of the vehicle 2 and the map information and sends information relating to the set scheduled driving route as navigation information to the electronic control unit 20 or the HMI device 25.

The outside information receiving device 27, for example, receives outside information sent from a road traffic information communication system center or other outside communication center. The outside information is, for example, congestion information or accident information or other road traffic information or meteorological information (rain or snow, fog, wind speed, temperature, humidity, or other information) etc. The outside information receiving device 27 sends the received outside information to the electronic control unit 20.

The SOC sensor 28a detects the amount of electric power Wn[kWh] of the current charged in the battery 215 (below, referred to as the "amount of battery electric power"). The load sensor 28b detects an output voltage proportional to the amount of depression of the accelerator pedal as a parameter corresponding to the driving load. The vehicle speed sensor 28c detects the speed of the vehicle 2.

The electronic control unit 20 is provided with an internal vehicle communication interface 201, vehicle storage part 202, and vehicle processing part 203. The internal vehicle communication interface 201, the vehicle storage part 202, and the vehicle processing part 203 are connected to each other through signal wires.

The internal vehicle communication interface 201 is a communication interface circuit for connecting the electronic control unit 20 to an internal vehicle network 29 based on the CAN (Controller Area Network) or other standard.

The vehicle storage part 202 has an HDD (hard disk drive) or optical recording medium, semiconductor memory, or other storage medium and stores various types of computer programs or data etc. used for processing at the vehicle processing part 203.

The vehicle processing part 203 has one or more processors and their peripheral circuits. The vehicle processing part 203 runs computer programs stored at the vehicle storage part 202 to comprehensively control the vehicle 2 and is, for example, a CPU. Below, the content of the control relating to mainly the preparation of a driving plan in the various control of the vehicle 2 performed by the vehicle processing part 203 and in turn the electronic control unit 20 will be explained.

The electronic control unit 20 switches the driving mode to either the EV (electric vehicle) mode or HV (hybrid vehicle) mode to make the vehicle 2 run.

The EV mode is a mode where the electric power of the battery 215 is utilized with priority so as to drive a power operation of the second rotating electric machine 214 to consume the electric power of the battery 215 and transmits the drive power of the second rotating electric machine 214 to the driving wheels to make the vehicle 2 run. Therefore, the EV mode is sometimes also called a "CD (charge depleting) mode".

When the driving mode is the EV mode, the electronic control unit 20 basically uses the electric power of the battery 215 in a state making the internal combustion engine 211 stop to drive a power operation of the second rotating electric machine 214 and makes the driving wheels rotate to make the vehicle 2 run by only the drive power of the second rotating electric machine 214.

On the other hand, the HV mode is a mode where the outputs of the internal combustion engine 211 and the second rotating electric machine 214 are controlled to make the vehicle 2 run so that the amount of battery electric power is maintained at the amount of electric power when switched to the HV mode (below, referred to as the "amount of sustained electric power"). Therefore, the HV mode is sometimes referred to as the "CS (charge sustaining) mode".

Figure 5:
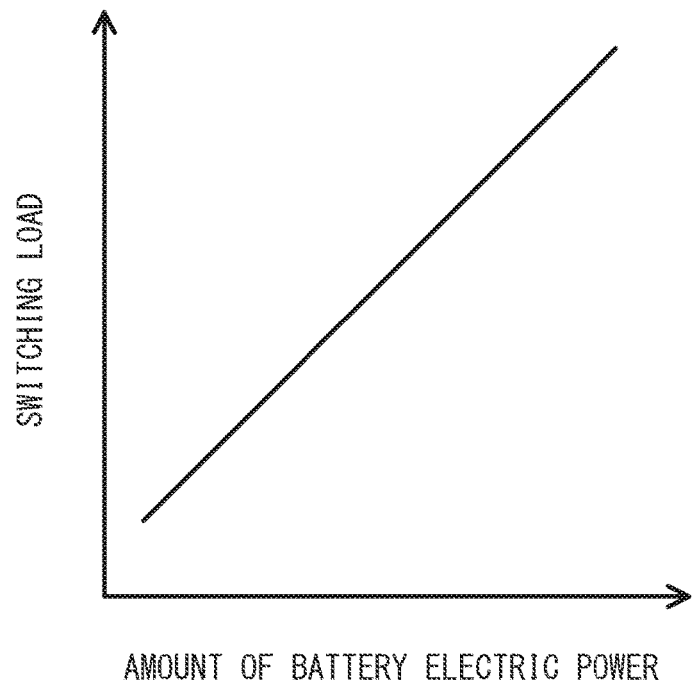
FIG. 5 is a view showing a relationship of an amount of battery electric power and a switching load.

When the driving mode is the HV mode, if the driving load is less than a predetermined switching load where the driving load changes in accordance with the amount of battery electric power shown in FIG. 5, in the same way as the above-mentioned EV mode, the electronic control unit 20 uses the electric power of the battery 215 in a state making the internal combustion engine 211 stop to drive a power operation of the second rotating electric machine 214 and makes the driving wheels rotate to make the vehicle 2 run by only the drive power of the second rotating electric machine 214. Note that the electronic control unit 20, as shown in FIG. 5, makes the switching load change in accordance with the amount of battery electric power so that the switching load becomes smaller the smaller the amount of battery electric power.

Further, if the driving load becomes greater than or equal to the switching load, the electronic control unit 20 splits the drive power of the internal combustion engine 211 by the drive power splitting mechanism 212 into two systems, transmits one split drive power of the internal combustion engine 211 to the driving wheels, and uses the other drive power to drive regenerative operation of the first rotating electric machine 213. Further, while using the generated electric power of the first rotating electric machine 213 to drive power operation of the second rotating electric machine 214, in accordance with need, part of the generated electric power is supplied to the battery 215 to charge the battery and, in addition to part of the drive power of the internal combustion engine 211, the drive power of the second rotating electric machine 214 is transmitted to the driving wheels to make the vehicle 2 run.

The internal combustion engine 211 tends to become poorer in heat efficiency the lower the engine load. For this reason, to keep down the amount of consumption of fuel, for example, the greater the number of traffic lights in the driving section or the greater the amount of traffic and the more easily congestion occurs in the driving section and otherwise when starts and stops are frequently repeated or low speed driving continues in the driving section, the driving mode is preferably set to the EV mode to make the vehicle 2 run. Further, when the driving section is one where steady driving where greater than or equal to a certain constant vehicle speed is maintained or otherwise the driving section is one with driving in a region of engine load with a good heat efficiency, the driving mode is preferably set to the HV mode to make the vehicle 2 run.

Figure 6A:
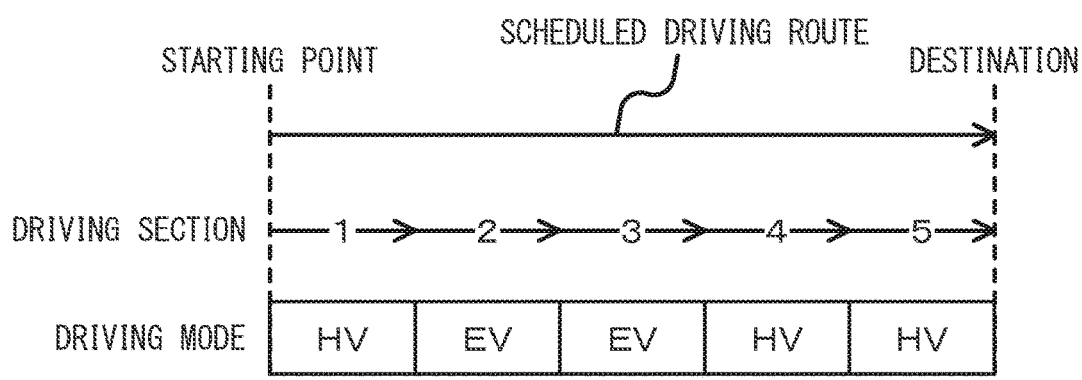
FIG. 6A is a view showing one example of a driving plan.

Therefore, in the case of a vehicle 2 able to be switched in driving mode between the EV mode and the HV mode, for example, as shown in FIG. 6A, preparing a driving plan splitting the scheduled driving route from the starting point (current position) to the destination into a plurality of driving section and designating which driving sections to be run in the EV mode and which driving sections to be run in the HV section based on map information of the driving sections (for example, the driving loads or other road information etc.) and switching the driving modes while running the vehicle 2 in accordance with the driving plan can be said to be an effective method for keeping down the amount of fuel consumption.

Figure 6B:
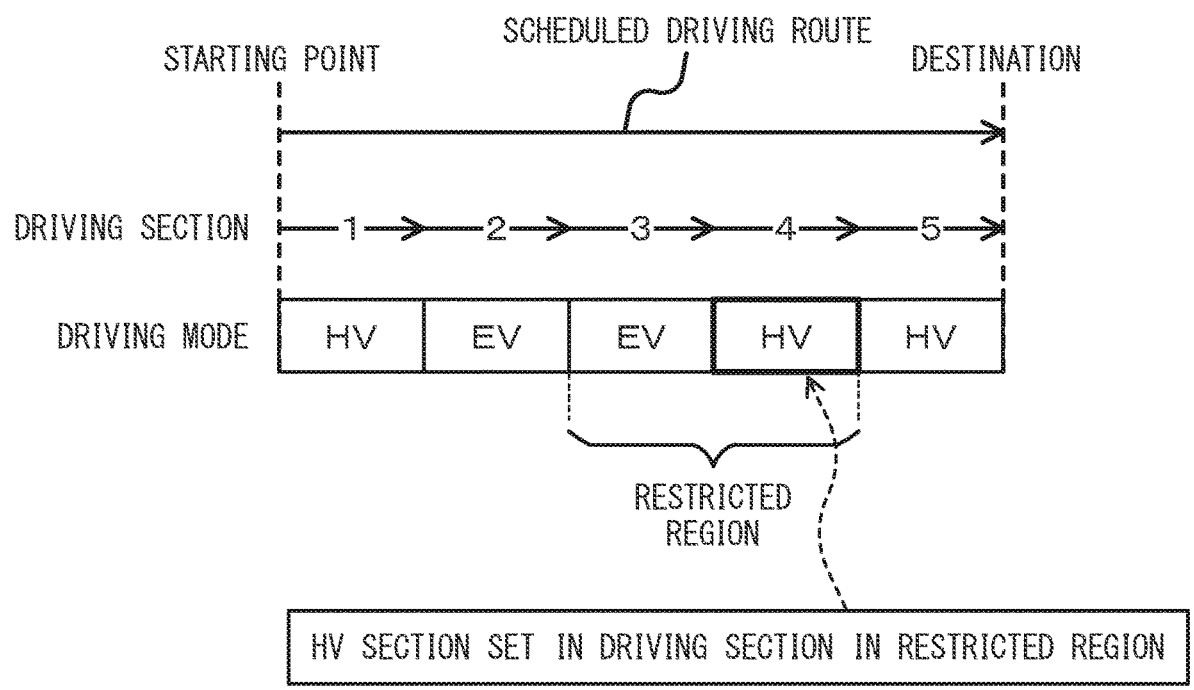
FIG. 6B is a view explaining problems in the case of preparing a driving plan without considering restricted regions.

However, in recent years, referring to FIG. 2, the above-mentioned restricted regions have been established at various locations. If preparing a driving plan not considering the existence of such restricted regions, for example, as shown in FIG. 6B, a driving plan which sets a driving section inside a restricted region to an HV section for driving in the HV mode is liable to end up being prepared.

If running inside a restricted region in a restricted time period, operation of the internal combustion engine 211 is restricted inside the restricted region, so even if setting a driving section present inside a restricted region to an HV section, it becomes necessary to run in the EV mode in that driving section. For this reason, it becomes unable to run the vehicle 2 while switching the driving mode as in the driving plan. As a result, compared to when able to drive according to the driving plan, the amount of fuel consumption increases or the amount of battery electric power becomes insufficient in the driving section inside a restricted region set as an HV section and, in the worst case, the electric power is liable to run out thereby rendering driving impossible.

Therefore, in the present embodiment, it was made possible to prepare a driving plan considering the existence of restricted regions. Below, referring to FIG. 7, the control for acquiring restricted region information will be explained, then the control for preparing a driving plan according to the present embodiment will be explained with reference to FIG. 8A to FIG. 8C.

Figure 7:
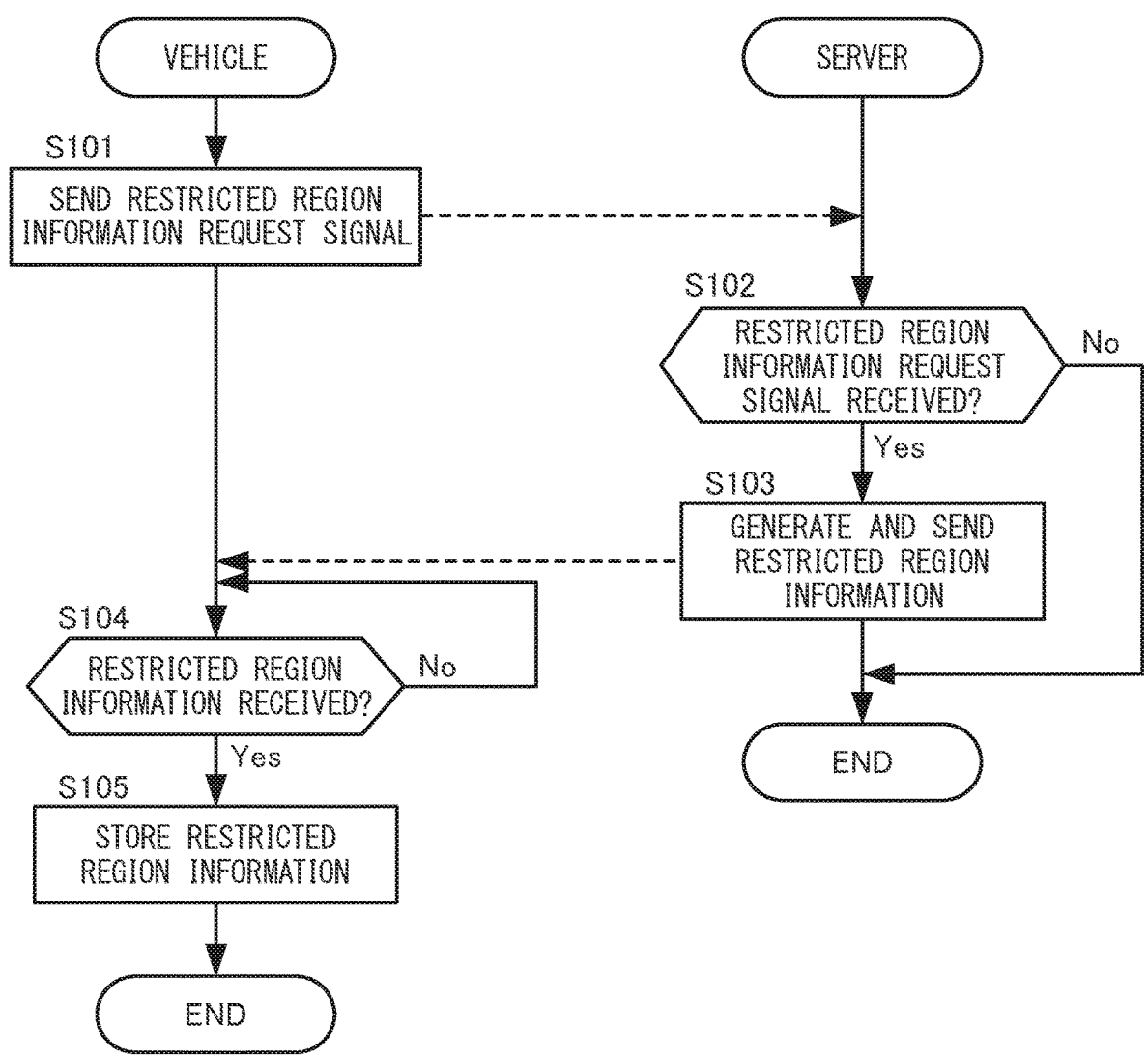
FIG. 7 is a flow chart explaining control for acquiring restricted region information.

FIG. 7 is a flow chart for explaining control for acquiring restricted region information according to the present embodiment. The electronic control unit 20 repeatedly performs the present routine at predetermined processing cycles.

At step S101, the electronic control unit 20 of the vehicle 2 sends a restricted region information request signal to the server 1 to acquire the restricted region information. In the present embodiment, the restricted region information request signal includes at least an identification number of the host vehicle stored in advance in the vehicle storage part 202 (for example the vehicle license plate number) and the scheduled driving route of the host vehicle. Note that the restricted region information is information including information relating to whether there is restricted region on the scheduled driving route, information on the boundary GF or restricted time period of the restricted region if there is a restricted region on the scheduled driving route, etc.

At step S102, the server 1 judges whether it has received a restricted region information request signal. If it has received a restricted region information request signal, the server 1 proceeds to the processing of step S3. On the other hand, if it has not received a restricted region information request signal, the server 1 ends the current processing.

At step S103, the server 1 generates the restricted region information and sends it to the vehicle 2 originally sending the restricted region information request signal (below, in accordance with need, also referred to as the "sending vehicle 2".

Specifically, the server 1 first judges if there is a restricted region present on the scheduled driving route of the sending vehicle 2 based on the information relating to restricted regions stored in the server storage part 12 and the scheduled driving route of the sending vehicle 2. Further, if there is not a restricted region present on the scheduled driving route of the sending vehicle 2, the server 1 generates restricted region information including information to that effect and sends it to the sending vehicle 2. On the other hand, if there is a restricted region present on the scheduled driving route of the sending vehicle 2, the server 1 generates restricted region information including information relating to the boundary GF and restricted time period of that restricted region and sends it to the sending vehicle 2.

At step S104, the electronic control unit 20 of the vehicle 2 judges if it has received the restricted region information. If it has received the restricted region information, the electronic control unit 20 proceeds to the processing of step S5. On the other hand, if it has not received the restricted region information, the electronic control unit 20 waits for a certain time, then again judges if it has received the restricted region information.

At step S105, the electronic control unit 20 of the vehicle 2 stores the content of the received restricted region information in the vehicle storage part 202 and updates the content of the restricted region information.

Note that in the present embodiment, in this way the server 1 is communicated with to acquire the restricted region information, but the disclosure is not limit to this. For example, if an outside communication center periodically sends information relating to restricted regions as outside information, it is also possible to acquire information relating to restricted regions by the outside information receiving device 27 and judge whether there is a restricted region on the scheduled driving route of the host vehicle based on that information by the electronic control unit 20.

Figure 8A:
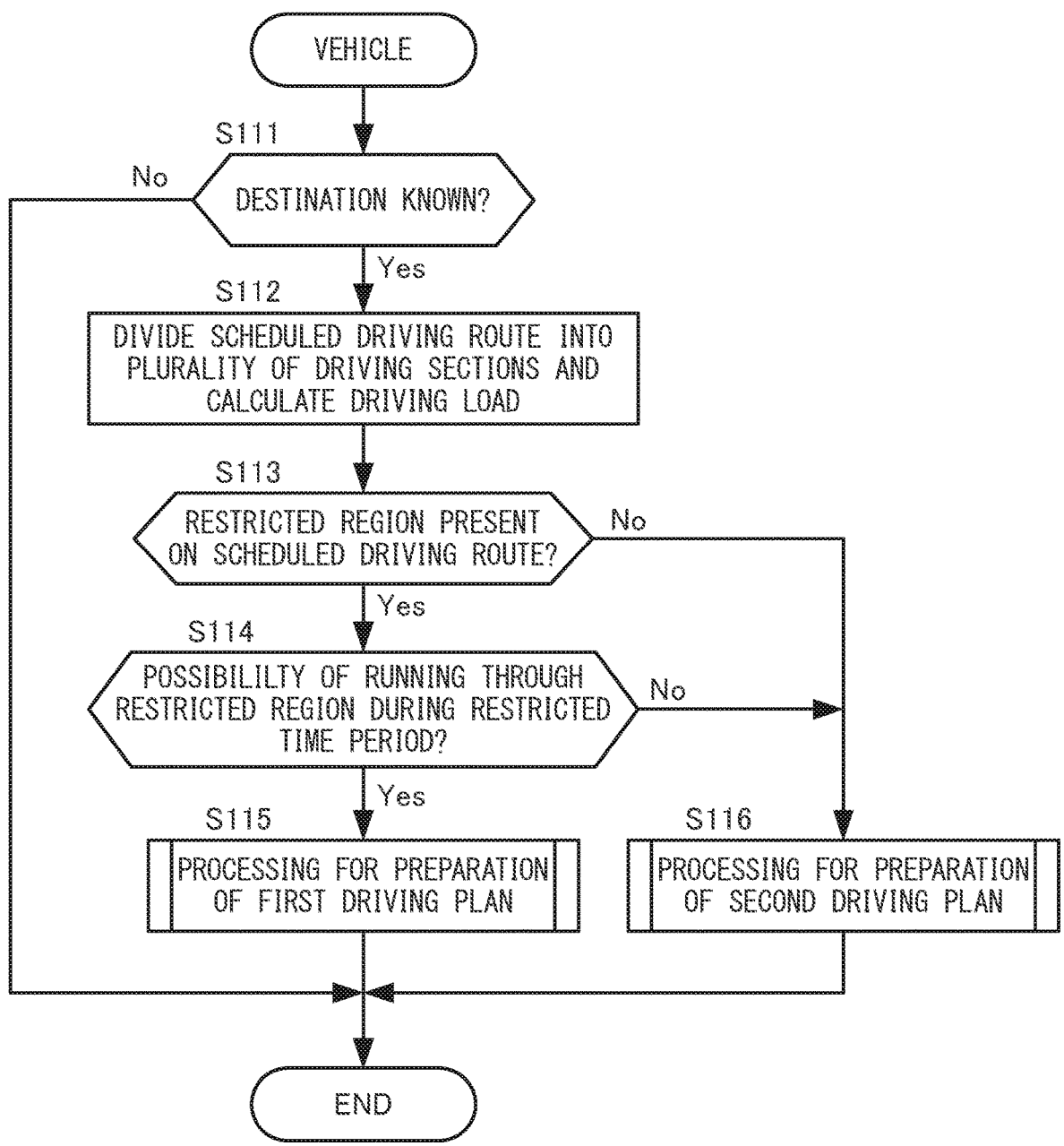
FIG. 8A is a flow chart explaining control for preparing a driving plan.

FIG. 8A is a flow chart for explaining control for preparing a driving plan according to the present embodiment. The electronic control unit 20 repeatedly performs the present routine at a predetermined processing cycle.

At step S111, the electronic control unit 20 of the vehicle 2 judges if the destination is known. The destination may be a destination input through the HMI device 25 by a vehicle occupant or for example may be a destination surmised based on the past driving history of the vehicle 2 etc. If the destination is known, the electronic control unit 20 proceeds to the processing of step S112. On the other hand, if the destination is not known, the electronic control unit 20 ends the current processing without preparing a driving plan.

At step S112, the electronic control unit 20 of the vehicle 2 divides the scheduled driving route into a plurality of driving sections and calculates the driving loads of the driving sections based on the map information.

At step S113, the electronic control unit 20 of the vehicle 2 refers to the restricted region information stored in the vehicle storage part 202 and judges if there is a restricted region present on the scheduled driving route of the host vehicle. If there is a restricted region on the scheduled driving route of the host vehicle, the electronic control unit 20 proceeds to the processing of step S114. On the other hand, if there is no restricted region on the scheduled driving route of the host vehicle, the electronic control unit 20 proceeds to the processing of step S116.

At step S114, the electronic control unit 20 of the vehicle 2 calculates the projected driving time ranges of the driving sections on the scheduled driving route based on the current time, map information, and outside information (road traffic information). Further, the electronic control unit 20 judges if among the driving sections present inside a restricted region, there is a driving section where the projected driving time range overlaps the restricted time period of that restricted region (below, referred to as a "restricted driving section"). If there is a restricted driving section, the electronic control unit 20 judges that there is a possibility of running through the inside of the restricted region during the restricted time period and proceeds to the processing of step S115. On the other hand, if there is no restricted driving section, the electronic control unit 20 judges that there is no possibility of running through the inside of the restricted region during the restricted time period and proceeds to the processing of step S116.

At step S115, the electronic control unit 20 of the vehicle 2 performs processing for preparation of a first driving plan for preparing a driving plan considering restricted regions (below, referred to as the "first driving plan"). Details of the processing for preparation of a first driving plan will be explained later referring to FIG. 8B.

At step S116, the electronic control unit 20 of the vehicle 2 performs processing for preparation of a second driving plan for preparing a normal driving plan not considering restricted regions (below, referred to as the "second driving plan"). Details of the processing for preparation of a second driving plan will be explained later referring to FIG. 8C.

Figure 8B:
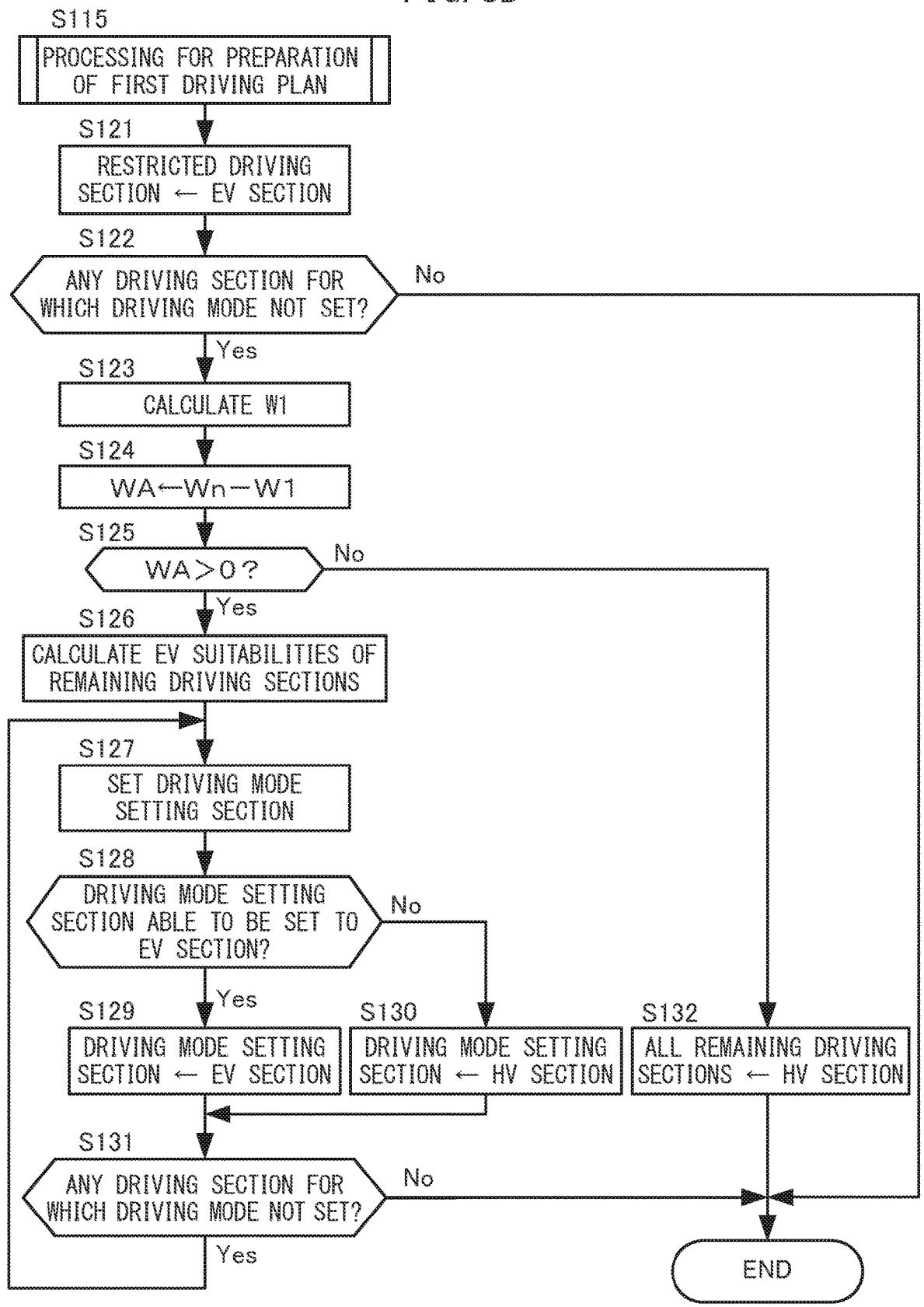
FIG. 8B is a flow chart explaining details of processing for preparation of a first driving plan according to the first embodiment of the present disclosure.

FIG. 8B is a flow chart explaining details of the processing for preparation of a first driving plan.

At step S121, the electronic control unit 20 of the vehicle 2 sets the restricted driving section as an EV section for running in the EV mode.

At step S122, the electronic control unit 20 of the vehicle 2 judges if there is any driving section for which the driving mode has not been set. If there is a driving section for which the driving mode has not been set, the electronic control unit 20 proceeds to the processing of step S123. On the other hand, if there is no driving section for which the driving mode has not been set, the electronic control unit 20 ends the preparation of the first driving plan.

At step 123, the electronic control unit 20 of the vehicle 2 calculates the estimated value W1[kWh] of the amount of electric power consumed when running through all of the restricted driving sections in the EV mode based on the driving loads of the restricted driving sections (the amount of electric power consumed for driving the second rotating electric machine 214 and the amount of electric power consumed by vehicle-mounted equipment other than the second rotating electric machine 214) (below, referred to as the "first estimated amount of electric power").

At step S124, the electronic control unit 20 of the vehicle 2 calculates the amount of battery electric power WA[kWh] able to be used in the remaining driving sections other than the restricted driving sections in the current amount of battery electric power Wn detected by the SOC sensor 28a (below, referred to as the "amount of available battery electric power"). In the present embodiment, the electronic control unit 20 calculates the remaining amount of electric power obtained by subtracting from the current amount of battery electric power Wn the first estimated amount of electric power W1 as the amount of available battery electric power WA.

At step S125, the electronic control unit 20 of the vehicle 2 judges if the amount of available battery electric power WA is larger than zero. If the amount of available battery electric power WA is greater than zero, the electronic control unit 20 proceeds to the processing of step S126. On the other hand, if the amount of available battery electric power WA is less than or equal to zero, the electronic control unit 20 proceeds to the processing of step S132.

At step S126, the electronic control unit 20 of the vehicle 2 calculates the EV suitabilities of the remaining driving sections based on the driving loads of the remaining driving sections other than the restricted driving sections on the scheduled driving route. The EV suitability is an indicator showing by which extent each driving section is suitable for EV driving. In the present embodiment, the lower the driving load of the driving section, the higher the value (that is, the more suitable for EV driving).

At step S127, the electronic control unit 20 of the vehicle 2 sets the driving section with the highest EV suitability among the driving sections for which the driving mode has not been set as the "driving mode setting section".

At step S128, the electronic control unit 20 of the vehicle 2 judges if it is possible to set the driving mode setting section as an EV section.

Specifically, the electronic control unit 20 first calculates the estimated value W2[kWh] of the amount of electric power consumed when driving through the driving mode setting section in the EV mode (below, referred to as the "second estimated amount of electric power") based on the driving load of the driving mode setting section.

Next, the electronic control unit 20 calculates the estimated value W3 [kWh] of the amount of electric power consumed when driving through the driving mode setting section and all of the driving sections already set as EV sections in the EV mode (below, referred to as the "third estimated amount of electric power").

Note that, when proceeding from step S126 to step S127 and first proceeding to the processing of the present step, the third estimated amount of electric power W3 becomes the value of the first estimated amount of electric power W1 plus the second estimated amount of electric power W2 calculated at the present step. On the other hand, if returning from step S131 to the processing of the present step, the third estimated amount of electric power W3 becomes the value of the previous value of the third estimated amount of electric power W3 plus the second estimated amount of electric power W2 newly calculated after returning to the processing of the present step.

Further, finally, the electronic control unit 20 judges if the amount of available battery electric power WA is greater than or equal to the third estimated amount of electric power W3. That is, the electronic control unit 20 judges if the amount of available battery electric power WA is greater than or equal to the amount of electric power enough for enabling the driving mode setting section to be newly set as an EV section in addition to the driving sections already set as EV sections. If the amount of available battery electric power WA is greater than or equal to the third estimated amount of electric power W3, the electronic control unit 20 judges that the driving mode setting section can be newly set as an EV section and proceeds to the processing of step S129. On the other hand, if the amount of available battery electric power WA is less than the third estimated amount of electric power W3, the electronic control unit 20 judges that the driving mode setting section cannot be set as an EV section and proceeds to the processing of step S130.

At step S129, the electronic control unit 20 of the vehicle 2 sets the driving mode setting section as an EV section.

At step S130, the electronic control unit 20 of the vehicle 2 sets the driving mode setting section as an HV section.

At step S131, the electronic control unit 20 of the vehicle 2 judges if there is any driving section for which the driving mode has not been set. The electronic control unit 20 returns again to step S127 if there is a driving section for which the driving mode has not been set and sets the driving mode for the driving section for which the driving mode has not been set. On the other hand, if there is no driving section for which the driving mode has not yet been set, the electronic control unit 20 ends the preparation of the first driving plan.

At step S132, the electronic control unit 20 of the vehicle 2 sets the driving modes of all of the remaining driving sections for which the driving mode has still not yet been set, including the driving mode setting section, as HV sections.

Note that, it is also possible to determine the driving modes of the driving sections, then decide at which of the HV sections among them the drive power of the internal combustion engine 211 should be used to enable part of the generated electric power generated at the first rotating electric machine 213 to be supplied to the battery 215 to charge the battery 215. If using the drive power of the internal combustion engine 211 to charge the battery 215, the load of the internal combustion engine 211 increases by exactly the amount generating electric power for charging the battery 215. For this reason, if charging the battery 215 in the low load side engine operation region, the noise of the internal combustion engine 211 is liable to increase along with the increase in load of the internal combustion engine 211. Therefore, in the present embodiment, even in an HV section, for example, a driving section where the driving load becomes greater than or equal to a predetermined load or other driving section where it is projected that operation of the internal combustion engine 211 will increase in the relatively high load side engine operating region is set as a charging section for charging the battery 215.

Figure 8C:
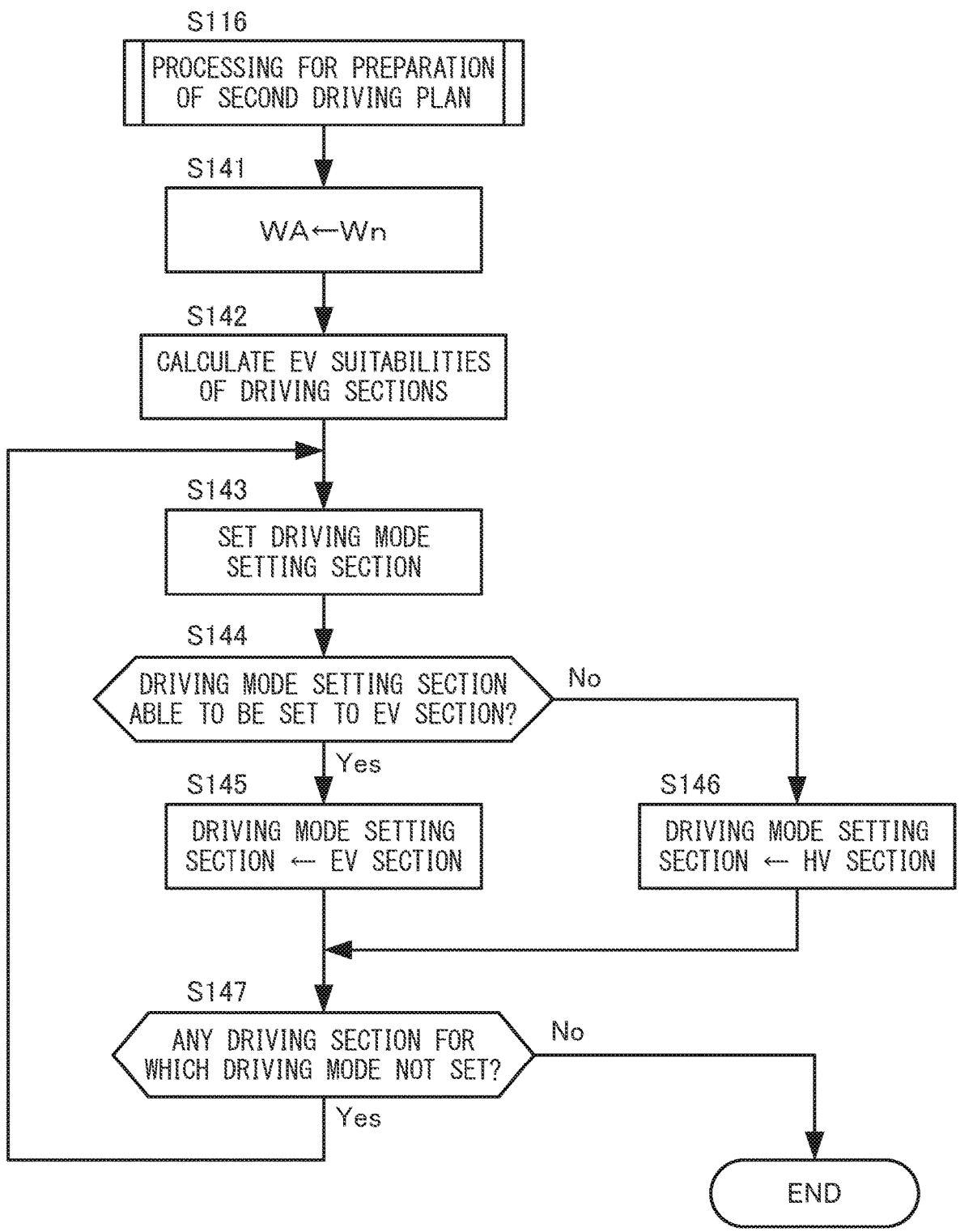
FIG. 8C is a flow chart explaining details of processing for preparation of a second driving plan according to the first embodiment of the present disclosure.

FIG. 8C is a flow chart explaining details of the processing for preparation of a second driving plan.

At step S141, the electronic control unit 20 of the vehicle 2 sets the current amount of battery electric power Wn as the amount of available battery electric power WA.

At step S142, the electronic control unit 20 of the vehicle 2 calculates the EV suitabilities of the driving sections based on the driving loads of the driving sections.

At step S143, the electronic control unit 20 of the vehicle 2 sets the driving section with the highest EV suitability among the driving sections for which the driving modes have not been set as the "driving mode setting section".

At step S144, the electronic control unit 20 of the vehicle 2 judges if the driving mode setting section can be set as an EV section.

Specifically, the electronic control unit 20 first calculates a second estimated amount of electric power W2[kWh] of the estimated value of the amount of electric power consumed when driving through the driving mode setting section in the EV mode based on the driving load of the driving mode setting section.

Next, the electronic control unit 20 calculates the estimated value W4[kWh] of the amount of electric power consumed if driving through the driving mode setting section and all driving sections already set as EV sections, if there are any such driving sections, in the EV mode (below, referred to as the "fourth estimated amount of electric power").

Note that, when proceeding from step S142 through step S143 and first proceeding to the processing of the present step, there are still no driving sections set as EV sections, so the fourth estimated amount of electric power W4 becomes the second estimated amount of electric power W2 calculated at this step. On the other hand, if returning from step S147 to the processing of the present step, the fourth estimated amount of electric power W4 becomes the value of the previous value of the fourth estimated amount of electric power W4 plus the second estimated amount of electric power W2 newly calculated after returning to the processing of the present step.

Finally, the electronic control unit 20 judges if the amount of available battery electric power WA is greater than or equal to the fourth estimated amount of electric power W4. That is, the electronic control unit 20 judges if the amount of available battery electric power WA is greater than or equal to the amount of electric power enabling driving through the driving mode setting section and all driving sections already set as EV sections if any in the EV mode. Further, if the amount of available battery electric power WA is greater than or equal to the fourth estimated amount of electric power W4, the electronic control unit 20 judges that the driving mode setting section can be set as an EV section and proceeds to the processing of step S145. On the other hand, if the amount of available battery electric power WA is less than the fourth estimated amount of electric power W4, the electronic control unit 20 judges that the driving mode setting section cannot be set as an EV section and proceeds to the processing of step S146.

At step S145, the electronic control unit 20 of the vehicle 2 sets the driving mode setting section as an EV section.

At step S146, the electronic control unit 20 of the vehicle 2 sets the driving mode setting section as an HV section.

At step S147, the electronic control unit 20 of the vehicle 2 judges if there is any driving section for which the driving mode has not been set. If there is a driving section for which the driving mode has not been set, the electronic control unit 20 returns again to step S143 where the driving mode is set for the driving section for which the driving mode has not yet been set. On the other hand, if there is no driving section for which the driving mode has not yet been set, the electronic control unit 20 ends the preparation of the second driving plan.

According to the present embodiment explained above, an electronic control unit 20 (vehicle control device) for controlling a vehicle 2 equipped with an internal combustion engine 211, a second rotating electric machine 214 (rotating electric machine), and a battery 215 is provided with a driving plan preparation part for preparing a driving plan dividing a scheduled driving route up to a destination of the vehicle 2 into a plurality of driving sections and setting which driving mode the driving sections should be driven in between an EV mode stopping the operation of the internal combustion engine 211 and driving by the drive power of the second rotating electric machine 214 and an HV mode running by drive power of the internal combustion engine 211 and the drive power of the second rotating electric machine 214 and a drive power control part for controlling the internal combustion engine 211 and the second rotating electric machine 214 based on the driving plan.

Further, the driving plan preparation part is configured so that, when a driving section is present inside a restricted region, it extracts as a restricted driving section from among driving sections present inside the restricted region a driving section through which it is projected the vehicle will be driven in a restricted time period in which operation of internal combustion engines 211 is restricted and prepares a driving plan able to drive through the restricted driving section in the EV mode.

Due to this, it is possible to prepare a driving plan enabling driving through the restricted driving section in the EV mode, that is, a suitable driving plan considering restricted regions.

Note that the driving plan preparation part according to the present embodiment is more specifically configured to set the driving mode of a restricted driving section as an EV mode, calculate the amount of electric power able to be used in the remaining driving sections other than the restricted driving section in the amount of electric power of the battery 215 as the amount of available battery electric power WA, and determine the driving modes of the remaining driving sections other than the restricted driving section based on the amount of available battery electric power WA. Further, the amount of available battery electric power WA is made the remaining amount of electric power obtained by subtracting from the current amount of battery electric power Wn the first estimated amount of electric power W1 of the estimated value of the amount of electric power consumed if driving through the restricted driving section in the EV mode.

Due to this, it is possible to prepare a driving plan enabling a vehicle to drive through the restricted driving section in the EV mode while driving through the other driving sections as much as possible in the EV mode. Therefore, it is possible to keep down the amount of fuel consumption as much as possible.

Further, the driving plan preparation part according to the present embodiment is configured so as to set a driving section with a driving load greater than or equal to a predetermined load among the driving sections for which the driving mode is set to the HV mode as a charging section for utilizing the drive power of the internal combustion engine 211 to charge the battery 215.

When utilizing the drive power of the internal combustion engine 211 to charge the battery 215, the load of the internal combustion engine 211 increases by exactly the amount for generating the electric power for charging the battery 215 and as a result the noise of the internal combustion engine 211 increases. Therefore, for example, if charging the battery 215 when the internal combustion engine 211 is being operated in a relatively low load side engine operating region or otherwise it is believed the noise is small, the noise of the internal combustion engine 211 ends up becoming noticeable and the vehicle occupants are liable to feel uncomfortable with the noise of the internal combustion engine 211.

Therefore, in the present embodiment, by charging the battery 215 in a driving section where the driving load becomes greater than or equal to a predetermined load, it is possible to charge the battery 215 in a driving section where it is projected the internal combustion engine 211 will more often be operated in a relatively high load side engine operating region, that is, a driving section where it is believed the noise would be great. For this reason, it is possible to keep the noise of the internal combustion engine 211 from ending up becoming noticeable at the time of charging the battery 215 and keep the vehicle occupants from feeling uncomfortable about the noise of the internal combustion engine 211.

Second Embodiment

Next, a second embodiment of the present disclosure will be explained. The present embodiment differs from the first embodiment on the point of preparing a driving plan of a current trip considering the next trip starting from that destination to a new next destination if the destination of the current trip is present inside a restricted region. Below, that point of difference will be focused on in the explanation.

If the destination of the current trip of the vehicle 2 is present inside a restricted region, at the next trip, the vehicle starts from the destination of the current trip present inside the restricted region toward the next destination. Therefore, if the next trip is started toward the next destination in the restricted time period, it becomes necessary to run in the EV mode from inside the restricted region until escaping from the restricted region. For this reason, if the amount of battery electric power at the time of start of the next trip is small, it is liable to become impossible to escape from inside the restricted region.

Therefore, in the present embodiment, if the destination of the current trip of the vehicle 2 is present inside a restricted region, the driving plan of the current trip is prepared so as to enable an amount of battery electric power necessary for escaping from inside the restricted region to outside the restricted region in the next trip to be left.

Figure 9A:
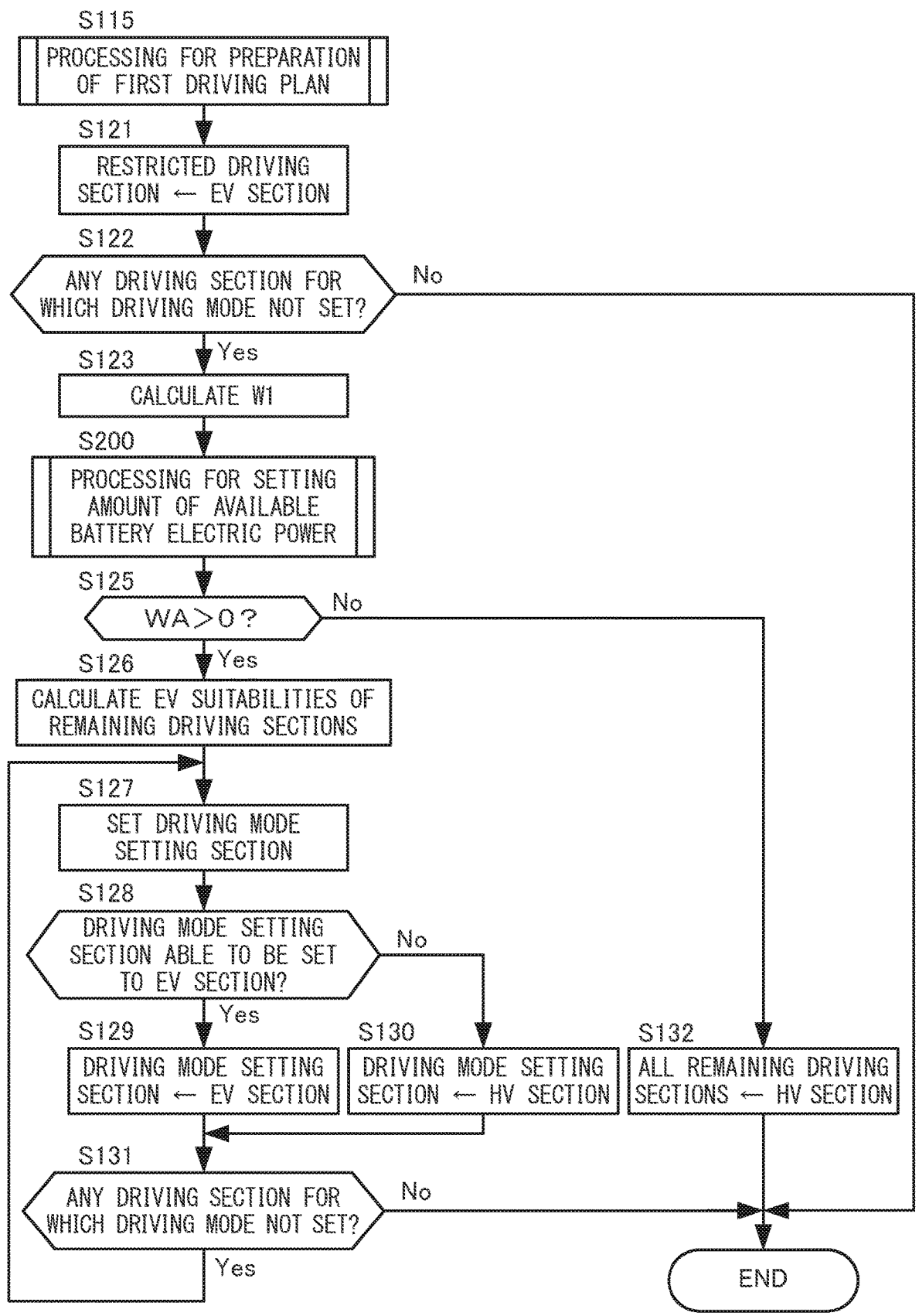
FIG. 9A is a flow chart explaining details of processing for preparation of a first driving plan according to a second embodiment of the present disclosure.

FIG. 9A is a flow chart explaining details of the processing for preparation of a first driving plan according to the present embodiment. In FIG. 9A, the contents of the processing of steps S121 to S123 and S125 to S132 are similar to the first embodiment, so explanations will be omitted here.

At step S200, the electronic control unit 20 of the vehicle 2 performs processing for setting the amount of available battery electric power WA. The processing for setting the amount of available battery electric power WA according to the present embodiment is processing for setting the amount of available battery electric power WA of the amount of battery electric power able to be used in the remaining driving sections other than the restricted driving section while considering the next trip. Details of the processing for setting the amount of available battery electric power WA according to the present embodiment performed during this first driving plan processing will be explained with reference to FIG. 9B.

Figure 9B:
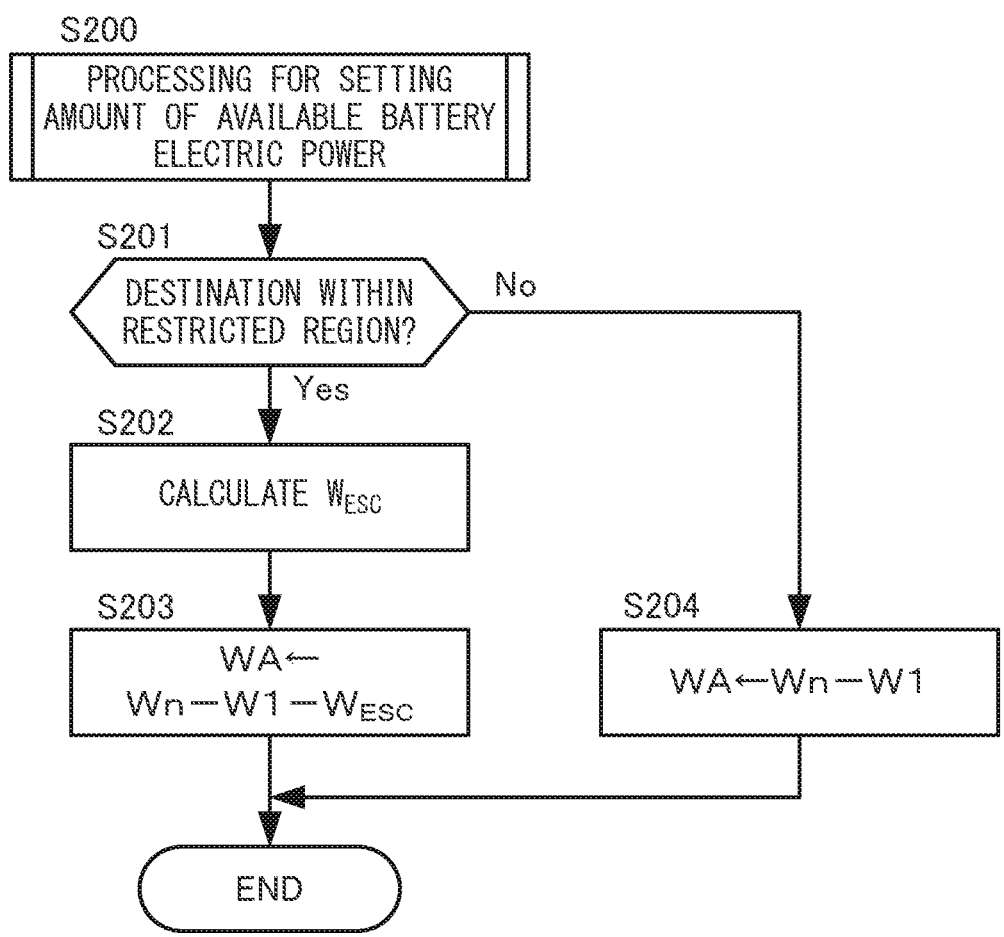
FIG. 9B is a flow chart explaining details of processing for setting an amount of available battery electric power according to the second embodiment of the present disclosure worked during the first driving plan processing.

FIG. 9B is a flow chart explaining details of the processing for setting the amount of available battery electric power WA according to the present embodiment performed during this first driving plan processing.

At step S201, the electronic control unit 20 of the vehicle 2 judges if the destination is present inside a restricted region. If the destination is present inside a restricted region, the electronic control unit 20 proceeds to the processing of step S202. On the other hand, if the destination is not present inside a restricted region, the electronic control unit 20 proceeds to the processing of step S204.

At step S202, the electronic control unit 20 of the vehicle 2 calculates the distances from the destination to road positions at the boundary GF of the restricted region (in the example shown in FIG. 2, Kd, Ke, Kf, Kg) and calculates the estimated value $W_{ESC}$ [kWh] of the minimum necessary amount of electric power for escaping from the inside of the restricted region based on the shortest distance among them (below, referred to as the "estimated amount of escape electric power").

At step S203, the electronic control unit 20 of the vehicle 2 sets the amount of electric power obtained by subtracting from the current amount of battery electric power Wn the first estimated amount of electric power W1 and the estimated amount of escape electric power $W_{ESC}$ as the amount of available battery electric power WA. Due to this, it is possible to prepare a driving plan so that an amount of battery electric power of exactly the amount of the estimated amount of escape electric power $W_{ESC}$ remains at the end of the current trip.

At step S204, the electronic control unit 20 of the vehicle 2 sets the amount of electric power obtained by subtracting from the current amount of battery electric power Wn the first estimated amount of electric power W1 as the amount of available battery electric power WA. Due to this, when the destination is not present inside a restricted region, it is possible to use up the amount of battery electric power without waste by driving according to the driving plan, so it is possible to keep down the amount of fuel consumption.

Figure 10A:
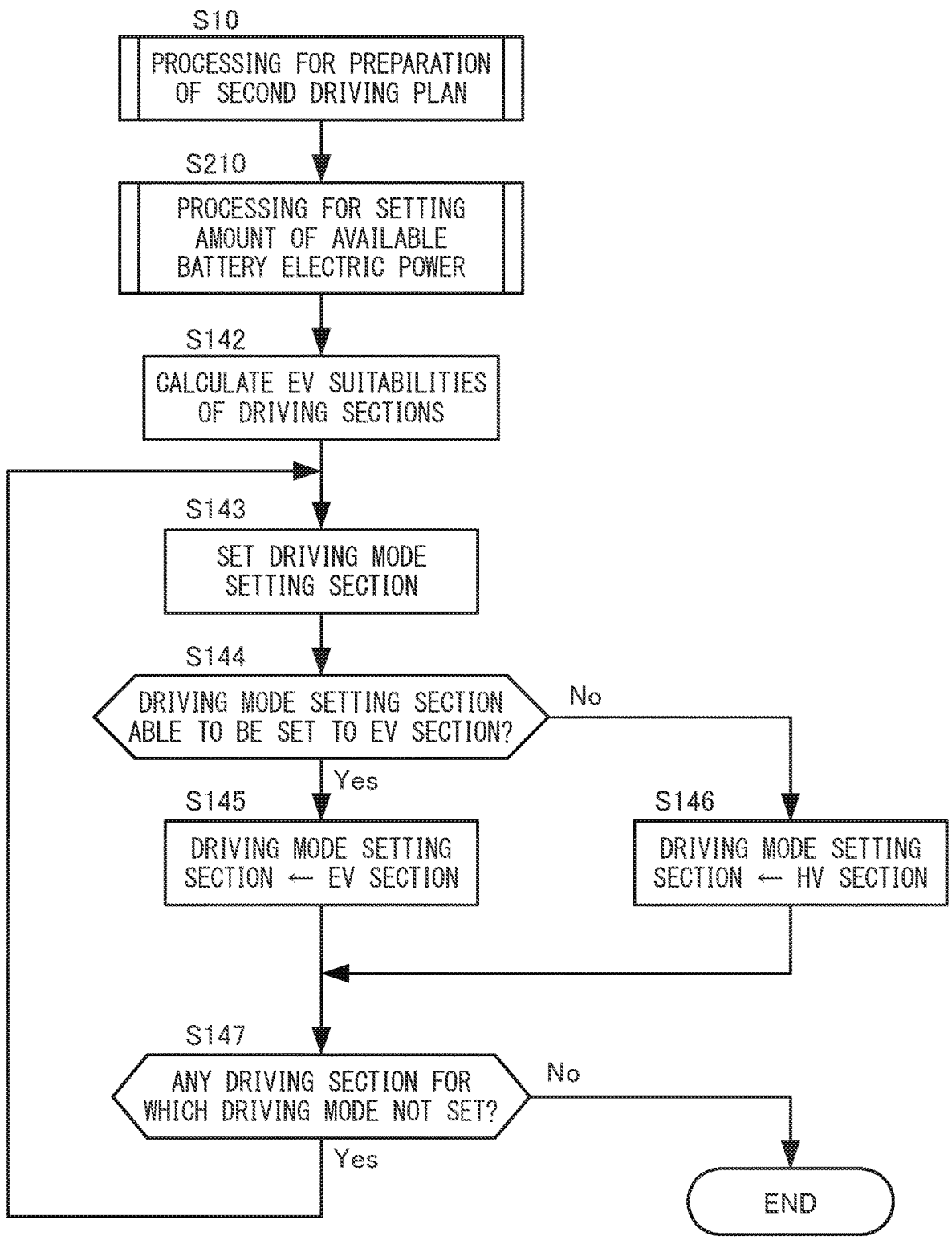
FIG. 10A is a flow chart explaining details of processing for preparation of a second driving plan according to the second embodiment of the present disclosure.

FIG. 10A is a flow chart explaining details of the processing for preparation of a second driving plan according to the present embodiment. In FIG. 10A, the contents of the processing of steps S142 to S147 are similar to the first embodiment, so the explanation will be omitted here.

At step S210, the electronic control unit 20 of the vehicle 2 performs processing for setting the amount of available battery electric power WA. Details of the processing for setting the amount of available battery electric power WA according to the present embodiment performed in this second driving plan processing will be explained with reference to FIG. 10B.

Figure 10B:
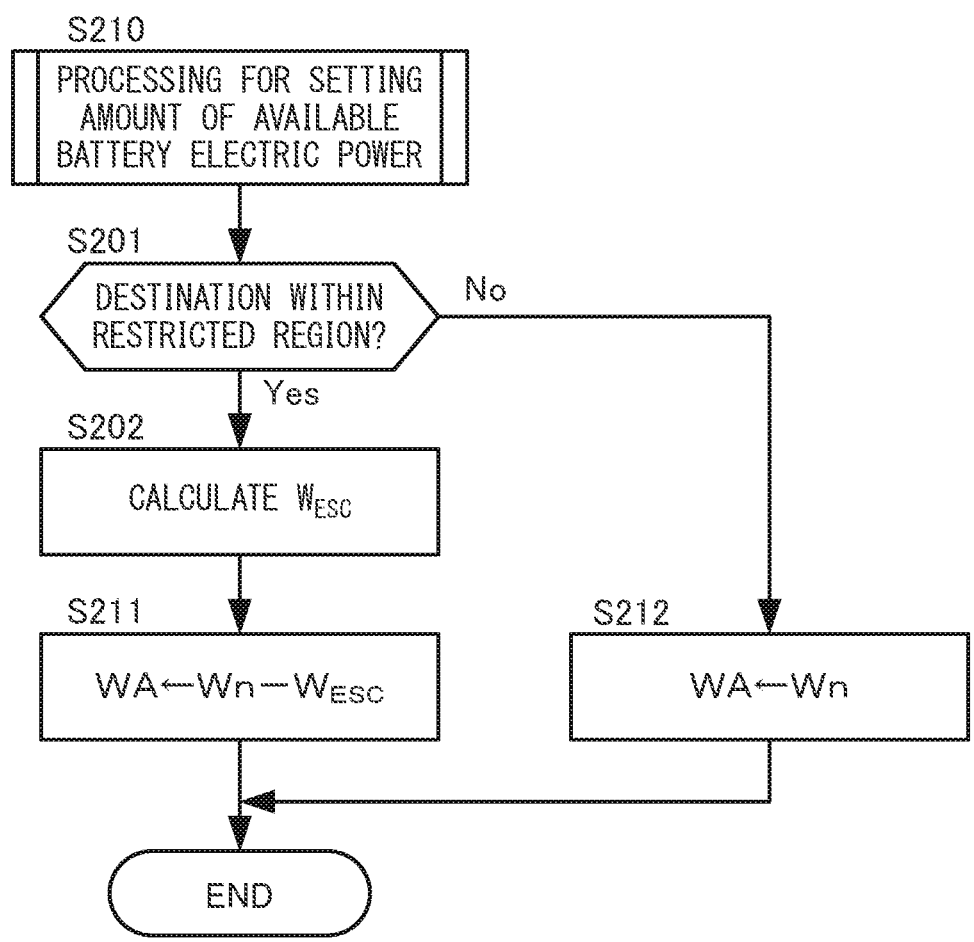
FIG. 10B is a flow chart explaining details of processing for setting an amount of available battery electric power according to the second embodiment of the present disclosure worked during the second driving plan processing.

FIG. 10B is a flow chart explaining details of the processing for setting the amount of available battery electric power WA according to the present embodiment performed during the second driving plan. The contents of the processing of steps S201, S202 of FIG. 10B are similar to the contents of the processing explained with reference to FIG. 9B, so explanations will be omitted here.

At step S211, the electronic control unit 20 of the vehicle 2 sets the amount of electric power obtained by subtracting from the current amount of battery electric power Wn the estimated amount of escape electric power $W_{E\_S\_C}$ as the amount of available battery electric power WA.

At step S212, the electronic control unit 20 of the vehicle 2 sets the current amount of battery electric power Wn as the amount of available battery electric power WA.

The electronic control unit 20 according to the present embodiment explained above, like in the first embodiment, is provided with a driving plan preparation part for preparing a driving plan dividing a scheduled driving route up to a destination of the vehicle 2 into a plurality of driving sections and setting which driving mode the driving sections should be driven in between an EV mode stopping the operation of the internal combustion engine 211 and driving by the drive power of the second rotating electric machine 214 and an HV mode running by drive power of the internal combustion engine 211 and the drive power of the second rotating electric machine 214.

Further, the driving plan preparation part according to the present embodiment is configured so as to prepare a driving plan where the amount of electric power of the battery 215 when arriving at the destination does not fall under the amount of electric power required for escaping from the destination to outside a restricted region when the destination is inside a restricted region.

Specifically, the driving plan preparation part according to the present embodiment is configured so that when calculating the amount of electric power able to be used in the remaining driving sections other than the restricted driving section in the current amount of battery electric power Wn as the amount of available battery electric power WA, it calculates the first estimated amount of electric power W1 of the estimated value of the amount of electric power consumed if driving through the restricted driving section in the EV mode and the estimated amount of escape electric power $W_{E\_S\_C}$ of the estimated value of the amount of electric power required for escaping from the destination to the outside of the restricted region.

Further, the driving plan preparation part according to the present embodiment is configured to set the remaining amount of electric power obtained by subtracting from the current amount of battery electric power Wn the first estimated amount of electric power W1 and the estimated amount of escape electric power $W_{E\_S}C$ as the amount of available battery electric power WA and determining the driving modes of the remaining driving sections other than the restricted driving section based on the amount of available battery electric power WA.

Due to this, when the destination of the current trip is present inside a restricted region, it is possible to prepare a driving plan where the amount of battery electric power of exactly the estimated amount of escape electric power $W_{E\_S\_C}$ remains at the time of end of the current trip. For this reason, it is possible to keep from becoming impossible to escape from the inside of the restricted region at the next trip.

Third Embodiment

Next, a third embodiment of the present disclosure will be explained. The present embodiment differs from the second embodiment in the contents of the processing for setting the amount of available battery electric power WA. Below, this point of difference will be focused on in the explanation.

In the above-mentioned second embodiment, the driving plan of the current trip was prepared so that if the destination of the current trip of the vehicle 2 was present inside a restricted region, it was possible to leave an estimated amount of escape electric power $W_{E\_S\_C}$ of an estimated value of the amount of battery electric power required for escaping from inside the restricted region to outside the restricted region in the next trip.

However, if it is scheduled to connect the battery 215 to an outside power source to fully charge it at for example the destination after arriving at the destination of the current trip, there is no need for leaving the estimated amount of escape electric power $W_{E\_S\_C}$ for the next trip and there is no problem even if ending up using up the amount of battery electric power in the current trip.

Therefore, in the present embodiment, it was made possible to prepare a driving plan of a current trip considering also the battery 215 being charged at the destination after arriving at the destination of the current trip if the destination of the current trip is present inside a restricted region.

Figure 11:
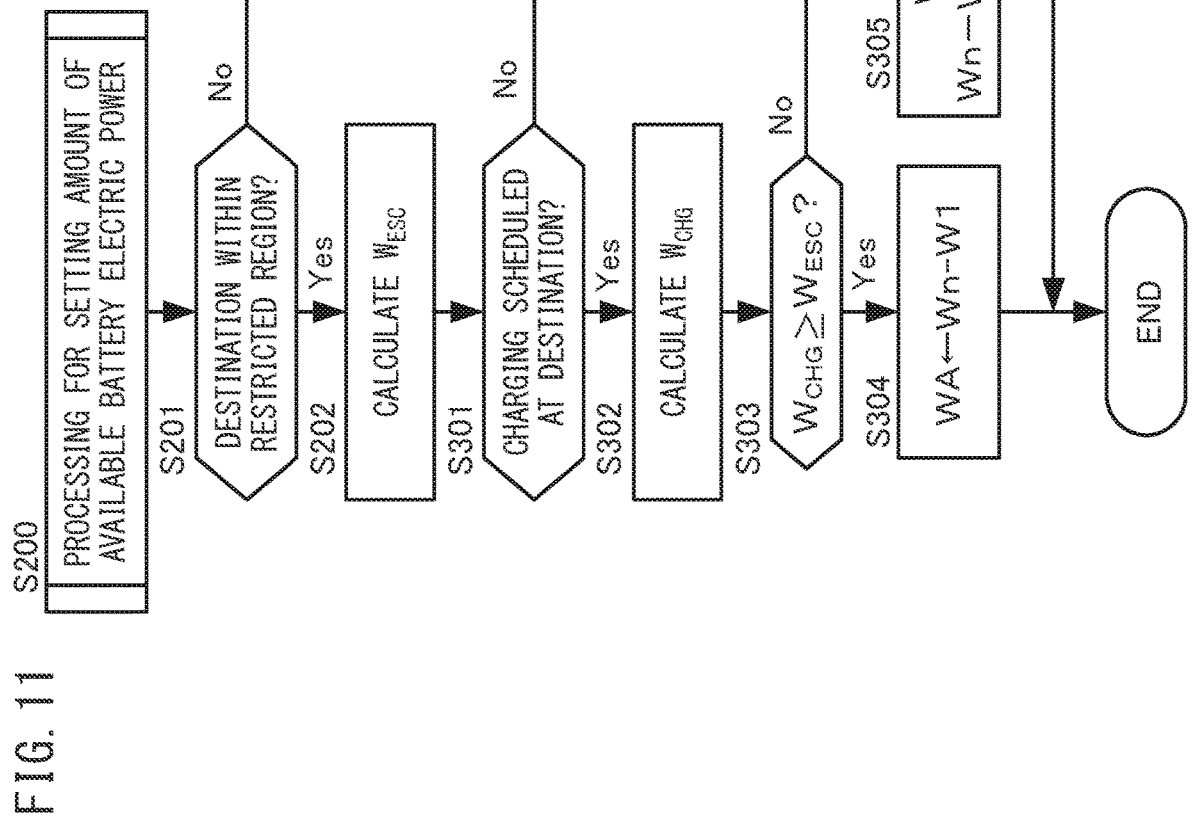
FIG. 11 is a flow chart explaining details of processing for setting an amount of available battery electric power according to a third embodiment of the present disclosure worked during the first driving plan processing.

FIG. 11 is a flow chart explaining details of processing for setting the amount of available battery electric power WA according to the present embodiment performed during the first driving plan processing. The contents of the processing of steps S201 to S204 in FIG. 11 are similar to the second embodiment, so the explanations will be omitted here.

At step S301, the electronic control unit 20 of the vehicle 2 judges if it is scheduled to charge the battery 215 at the destination of the current trip. If it is scheduled to charge the battery 215 at the destination of the current trip, the electronic control unit 20 proceeds to the processing of step S302. On the other hand, if it is not scheduled to charge the battery 215 at the destination of the current trip, the electronic control unit 20 proceeds to the processing of step S203.

Note that in the present embodiment, to judge whether there is a schedule for charging the battery 215 at the destination of the current trip, when the destination is input by a vehicle occupant through the HMI device 25, the occupant is made to confirm whether there is a schedule for charging at the destination before input. Further, if there is a schedule for charging at the destination, to obtain a grasp of to what extent the battery 215 can be charged at the destination of the current trip, the occupant is further made to input the scheduled charging time at the destination. However, the method of judging if there is a schedule for charging the battery 215 at the destination of the current trip is not limited to such a method. For example, it is made possible to judge this according to the type of the destination input through the HMI device 25 (for example, the home or a location with a charging station etc.) or the past results of charging at the destination etc.

At step S302, the electronic control unit 20 of the vehicle 2 calculates the estimated value $W_{CH\_G}$[kWh] of the amount of electric power charged at the battery 215 at the destination after reaching the destination of the current trip based on the scheduled charging time (below, referred to as the "estimated amount of charged electric power"). The estimated amount of charged electric power $W_{CHG}$ becomes a larger value the longer the scheduled charging time.

At step S303, the electronic control unit 20 of the vehicle 2 judges if the estimated amount of charged electric power $W_{CHG}$ is greater than or equal to the estimated amount of escape electric power $W_{ESC}$.

If the estimated amount of charged electric power $W_{CHG}$ is greater than or equal to the estimated amount of escape electric power $W_{ESC}$, there is no need to leave the estimated amount of escape electric power $W_{ESC}$ for the next trip and there is no problem even if ending up using up the amount of battery electric power at the current trip, so the electronic control unit 20 proceeds to the processing of step S304 where the remaining amount of electric power obtained by subtracting from the current amount of battery electric power Wn the first estimated amount of electric power W1 is set as the amount of available battery electric power WA.

On the other hand, if the estimated amount of charged electric power $W_{CHG}$ is less than the estimated amount of escape electric power $W_{ESC}$, if ending up using up the amount of battery electric power in the current trip, even if charging at the destination of the current trip as scheduled, there is a possibility of the electric power required for escaping from inside the restricted region to outside the restricted region becoming insufficient at the next trip by exactly the amount of electric power $W_{SHTG}(=W_{ESC}-W_{CHG})$[kWh] short from the estimated amount of escape electric power $W_{ESC}$ (below, referred to as the "amount of short electric power"), so the electronic control unit 20 proceeds to the processing of step S305.

At step S305, the electronic control unit 20 of the vehicle 2 sets the remaining amount of electric power, obtained by subtracting from the current amount of battery electric power Wn the first estimated amount of electric power W1 and amount of short electric power $W_{SHTG}$, as the amount of available battery electric power WA.

Figure 12:
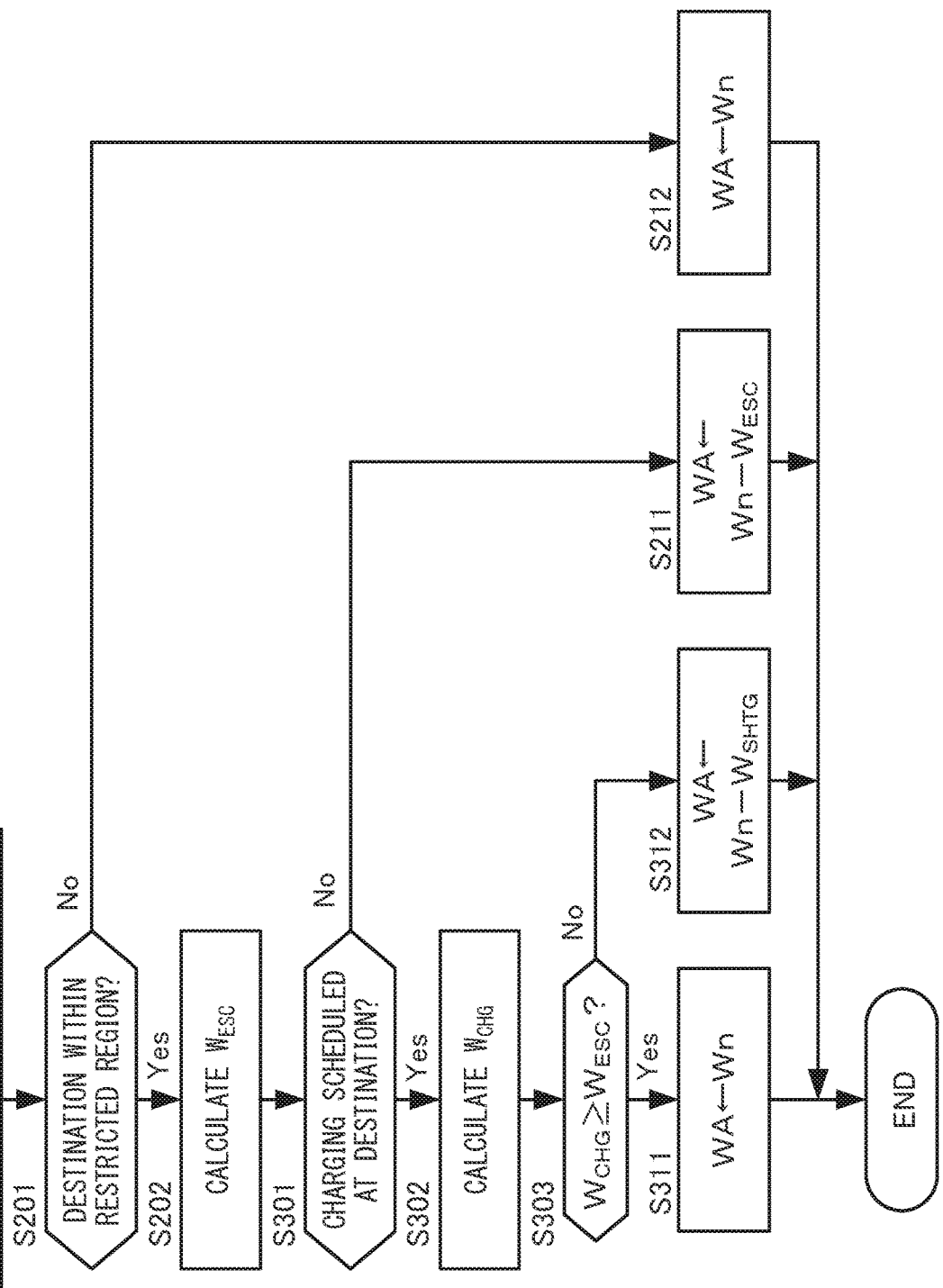
FIG. 12 is a flow chart explaining details of processing for setting an amount of available battery electric power according to the third embodiment of the present disclosure worked during the second driving plan processing.

FIG. 12 is a flow chart explaining details of processing for setting the amount of available battery electric power WA according to the present embodiment performed in the second driving plan processing. In FIG. 12, the contents of the processing of steps S201 and S202, the contents of the processing of S211 and S212, and the contents of the processing of S301 to S303 are as explained above referring to respectively FIG. 9B, FIG. 10B, and FIG. 11, so explanations will be omitted here.

At step S311, since the estimated amount of charged electric power $W_{CHG}$ is greater than or equal to estimated amount of escape electric power $W_{ESC}$, there is no need to leave the estimated amount of escape electric power $W_{ESC}$ for the next trip, and there is no problem even if ending up using the amount of battery electric power up at the current trip, the electronic control unit 20 of the vehicle 2 sets the current amount of battery electric power Wn as the amount of available battery electric power WA.

At step S312, since the estimated amount of charged electric power $W_{CHG}$ is less than the estimated amount of escape electric power $W_{ESC}$, if the amount of battery electric power ends up being used up in the current trip, even if charging as scheduled at the destination of the current trip, there is a possibility of the electric power necessary for escaping from the inside of the restricted region to the outside of the restricted region in the next trip becoming insufficient by exactly the short amount of electric power $W_{SHTG}(=W_{ESC}-W_{CHG})$, the electronic control unit 20 of the vehicle 2 sets the remaining amount of electric power, obtained by subtracting from the current amount of battery electric power Wn the amount of short electric power $W_{SHTG}$, as the amount of available battery electric power WA.

The electronic control unit 20 according to the present embodiment explained above also, in the same way as the first embodiment, is provided with a driving plan preparation part for preparing a driving plan dividing a scheduled driving route up to a destination of the vehicle 2 into a plurality of driving sections and setting which driving mode the driving sections should be driven in between an EV mode stopping the operation of the internal combustion engine 211 and driving by the drive power of the second rotating electric machine 214 and an HV mode running by drive power of the internal combustion engine 211 and the drive power of the second rotating electric machine 214.

Further, the driving plan preparation part according to the present embodiment is configured so that if the destination is present inside a restricted region, when scheduled to charge the battery 215 at the destination, it prepares a driving plan where the amount of electric power of the battery 215 at the time of starting the next trip starting from the destination does not fall below the amount of electric power required for escaping from the destination to outside the restricted region.

Specifically, the driving plan preparation part according to the present embodiment calculates the amount of electric power able to be used in the remaining driving sections other than the restricted driving section in the current amount of battery electric power Wn as the amount of available battery electric power WA during which it calculates the first estimated amount of electric power W1 of the estimated value of the amount of electric power consumed when running through the restricted driving section in the EV mode, the estimated amount of escape electric power $W_{ESC}$ of the estimated value of the amount of electric power required for escaping from the destination to the outside of the restricted region, and the estimated amount of charged electric power $W_{CHG}$ of the estimated value of the amount of electric power charged at the destination.

Further, the driving plan preparation part according to the present embodiment is configured to make the remaining amount of electric power, obtained by subtracting from the current amount of battery electric power Wn the first estimated amount of electric power W1, the amount of available battery electric power WA if the estimated amount of charged electric power $W_{CHG}$ is greater than or equal to the estimated amount of escape electric power $W_{ESC}$, make the remaining amount of electric power, obtained by subtracting from the current amount of battery electric power Wn the first estimated amount of electric power W1 and the difference between the estimated amount of escape electric power $W_{ESC}$ and the estimated amount of charged electric power $W_{CHG}$ (=shortage amount of electric power $W_{SHTG}$), the amount of available battery electric power WA if the estimated amount of charged electric power $W_{CHG}$ is less than the estimated amount of escape electric power $W_{ESC}$, and determine the driving modes of the remaining driving sections other than the restricted driving section based on the amount of available battery electric power WA.

Due to this, if it is scheduled to charge the battery 215 at the destination of the current trip, it is possible to prepare a driving plan considering the charging schedule. That is, it is possible to increase the amount of available battery electric power WA of the current trip by exactly the amount of charged electric power scheduled. For this reason, compared with when preparing a driving plan not considering the charging schedule, it is possible to increase the running time and distance in which the vehicle can be run in the EV mode, so it is possible to improve the fuel efficiency and improve the exhaust emissions.

Fourth Embodiment

Next, a fourth embodiment of the present disclosure will be explained. The present embodiment differs from the above embodiments on the point of changing the scheduled driving route if running while switching the driving mode in accordance with a driving plan and the vehicle is liable to have to enter a restricted region in a restricted time period in a state with the amount of battery electric power smaller than a predetermined value. Below, this point of difference will be focused on in the explanation.

Inside a restricted region in a restricted time period, operation of the internal combustion engine 211 is restricted, so the vehicle must run in the EV mode even if in a state where the amount of battery electric power is not sufficiently secured and it is not possible to operate the internal combustion engine 211 to charge the battery 215. For this reason, if entering a restricted region in a restricted time period in the state where the amount of battery electric power is not sufficiently secured, in the worst case, the electric power is liable to run out and thereby render driving impossible.

Therefore, in the present embodiment, assuming periodically preparing and updating a driving plan while the vehicle is running, each time updating the driving plan, the estimated value $W_{BAT}$[kWh] of the amount of battery electric power at the time of entry into the restricted region projected when running in accordance with the updated driving plan (below, referred to as the "estimated amount of entry battery electric power") is calculated. Further, when the estimated amount of entry battery electric power $W_{BAT}$ is less than a predetermined first threshold value Wth1, it is judged that the vehicle will enter the restricted region in the restricted time period in the state where the amount of battery electric power is not sufficiently secured and an alternative driving route for taking the place of the scheduled driving route is searched for. Below, the control for searching for the alternative driving route according to the present embodiment will be explained.

Figure 13:
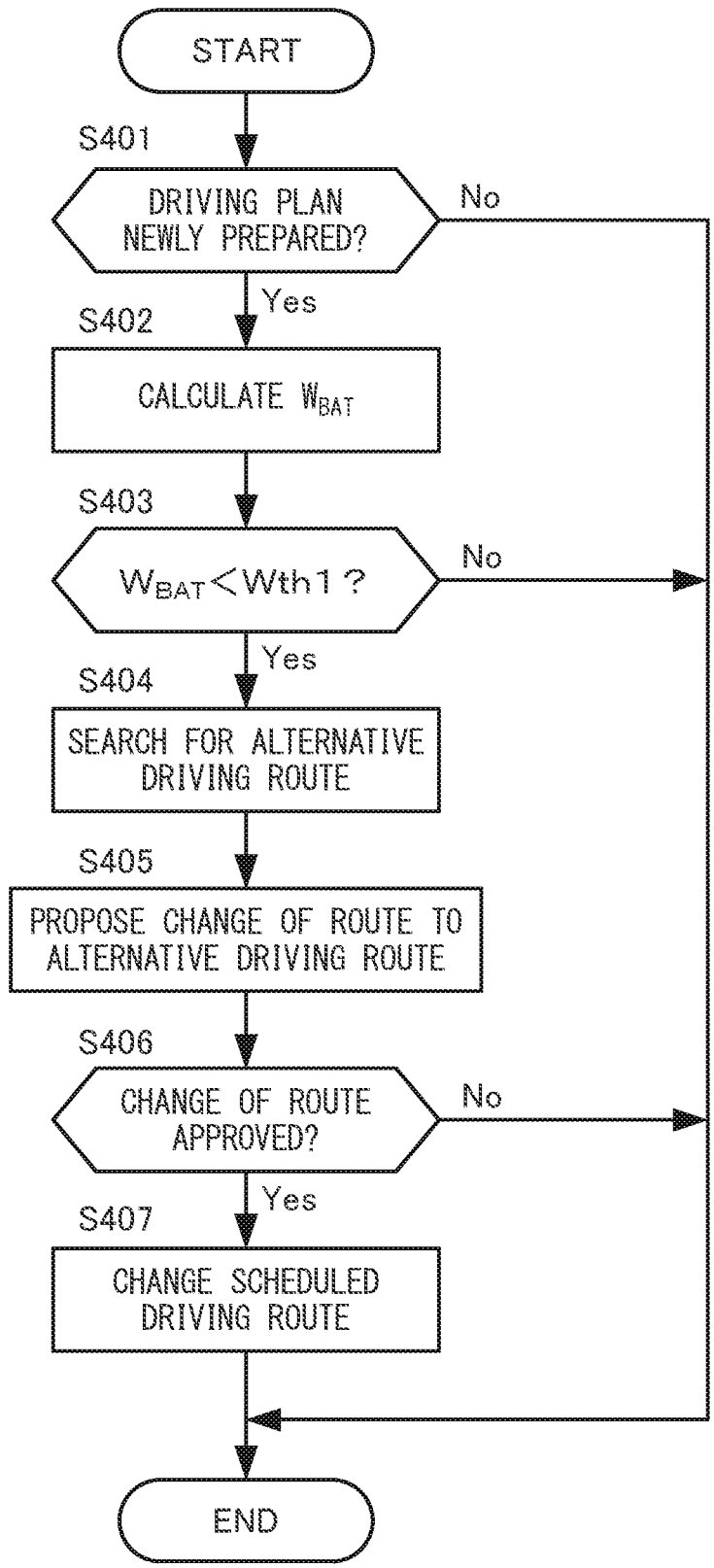
FIG. 13 is a flow chart explaining control for searching for an alternative driving route according to a fourth embodiment of the present disclosure.

FIG. 13 is a flow chart explaining control for searching for an alternative driving route according to the present embodiment.

At step S401, the electronic control unit 20 of the vehicle 2 judges if a driving plan has been newly prepared. If a driving plan has been newly prepared, the electronic control unit 20 proceeds to the processing of step S402. On the other hand, if a driving plan has not been newly prepared, the electronic control unit 20 ends the current processing.

At step S402, the electronic control unit 20 of the vehicle 2 calculates the estimated amount of entry battery electric power $W_{BAT}$ projected when running while switching driving modes in accordance with the newly prepared driving plan. The method of calculating the estimated amount of entry battery electric power $W_{BAT}$ is not particularly limited, but, for example, it can be calculated by subtracting from the current amount of battery electric power Wn the estimated value of the amount of electric power consumed when running through all of the EV sections present before the restricted region in the EV mode.

At step S403, the electronic control unit 20 of the vehicle 2 judges if the estimated amount of entry battery electric power $W_{BAT}$ is less than the first threshold value Wth1. If the estimated amount of entry battery electric power $W_{BAT}$ is less than the first threshold value Wth1, the electronic control unit 20 proceeds to the processing of step S404. On the other hand, if the estimated amount of entry battery electric power $W_{BAT}$ is greater than or equal to the first threshold value Wth1, the electronic control unit 20 judges that there is no need to change the scheduled driving route and ends the current processing.

Note that in the present embodiment, the electronic control unit 20 sets an amount of electric power of an extent enabling passage through the restricted region (for example, an amount of electric power of an extent enabling driving from one road position to another road position on the boundary GF of the restricted region) as the first threshold value Wth1.

However, for example, if information relating to the amount of battery electric power when one or more other vehicles enter the restricted region is collected at the server 1 as macro data, it is possible to set the first threshold value Wth1 based on the distribution of data of the amount of entry battery electric power into the restricted region collected at the server 1. Specifically, it is possible to set the center value or average value or most frequent value etc. in the distribution of data of the amounts of battery electric power at the time of entry into the restricted region collected at the server 1 as the first threshold value Wth1.

Further, if a solar panel is attached to the vehicle 2 and the electric power generated by the solar panel can be charged into the battery 215, that is, if the battery 215 is configured so as to be able to store electric power generated by utilizing sunlight to generate electric power, it is also possible to set the first threshold value Wth1 based on the weather around the restricted region. Specifically, if the weather around the restricted region is cloudy or rain, the first threshold value Wth1 may be set higher than if it is clear.

Further, regardless of whether a solar panel is attached or not, for example, if the weather around the restricted region is rain or otherwise if the humidity around the restricted region is high, envisioning that the air-conditioner load will increase for dehumidification, it is also possible to raise the first threshold value Wth1 compared with if the humidity around the restricted region is low.

At step S404, the electronic control unit 20 of the vehicle 2 searches for an alternative driving route by which an increase in the estimated amount of entry battery electric power $W_{BAT}$ can be expected compared with the current scheduled driving route based on the current position information and the map information. The electronic control unit 20, for example, searches among the plurality of driving routes from the current position until entry into the restricted region for a driving route with many driving sections suitable for the HV mode and by which it is believed that the distance running in the EV mode would become shorter than the current scheduled driving route as an alternative driving route. Further, for example, it searches among the plurality of driving routes from the current position until entry into the restricted region for a driving route with many downhill slopes, a driving route with many driving sections with relatively high driving loads and suitable for running while charging the battery 215 using the drive power of the internal combustion engine 211, or another driving route by which it is believed the amount of regenerated electric power will become greater than the current driving route, as an alternative driving route.

At step S405, the electronic control unit 20 of the vehicle 2 proposes a change of route to the alternative driving route to the vehicle occupants through the HMI device 25.

At step S406, the electronic control unit 20 of the vehicle 2 judges if the change of route to the alternative driving route has been approved by a vehicle occupant. In the present embodiment, the electronic control unit 20 judges that the change of route to the alternative driving route has been approved by a vehicle occupant when a vehicle occupant indicates his or her intent of approval through the HMI device 25 before a predetermined time elapses from when change of route to the alternative driving route was proposed. When it is judged that the change of route to the alternative driving route has been approved by a vehicle occupant, the electronic control unit 20 proceeds to the processing of step S407. On the other hand, when it is judged that the change of route to the alternative driving route has not been approved by a vehicle occupant, the electronic control unit 20 ends the current processing.

At step S407, the electronic control unit 20 of the vehicle 2 changes the scheduled driving route to the alternative driving route.

Note that in the present embodiment, in this way, an alternative driving route was searched for and a change of route to the alternative driving route was proposed to the vehicle occupants, but for example if the vehicle 2 is an automated driving vehicle able to autonomously run, it is also possible to automatically switch the scheduled driving route to the alternative driving route and run along the alternative driving route.

The electronic control unit 20 according to the present embodiment explained above is configured to calculate an estimated amount of entry battery electric power $W_{BAT}$ of an estimated value of the amount of electric power of the battery 215 when entering a restricted region projected when driving along a scheduled driving route in accordance with the driving plan and search for an alternative driving route taking the place of the scheduled driving route if the estimated amount of entry battery electric power $W_{BAT}$ is less than the predetermined first threshold value Wth1.

Due to this, when the estimated amount of entry battery electric power $W_{BAT}$ is less than the first threshold value Wth1, it is possible to propose an alternative driving route to the vehicle occupants or, if the vehicle 2 is an automated driving vehicle able to autonomously run, automatically change the scheduled driving route to the alternative driving route. For this reason, for example, it is possible to keep from falling in a situation where the vehicle ends up entering a restricted region in a restricted time period in a state where the amount of electric power of the battery 215 is not sufficiently secured.

Fifth Embodiment

Next, a fifth embodiment according to the present disclosure will be explained. The present embodiment differs from the fourth embodiment on the point of setting the estimated amount of entry battery electric power $W_{BAT}$ calculated based on the driving plan prepared at the time of start of the trip as the first threshold value Wth1. Below, this point of difference will be focused on in the explanation.

Figure 14:
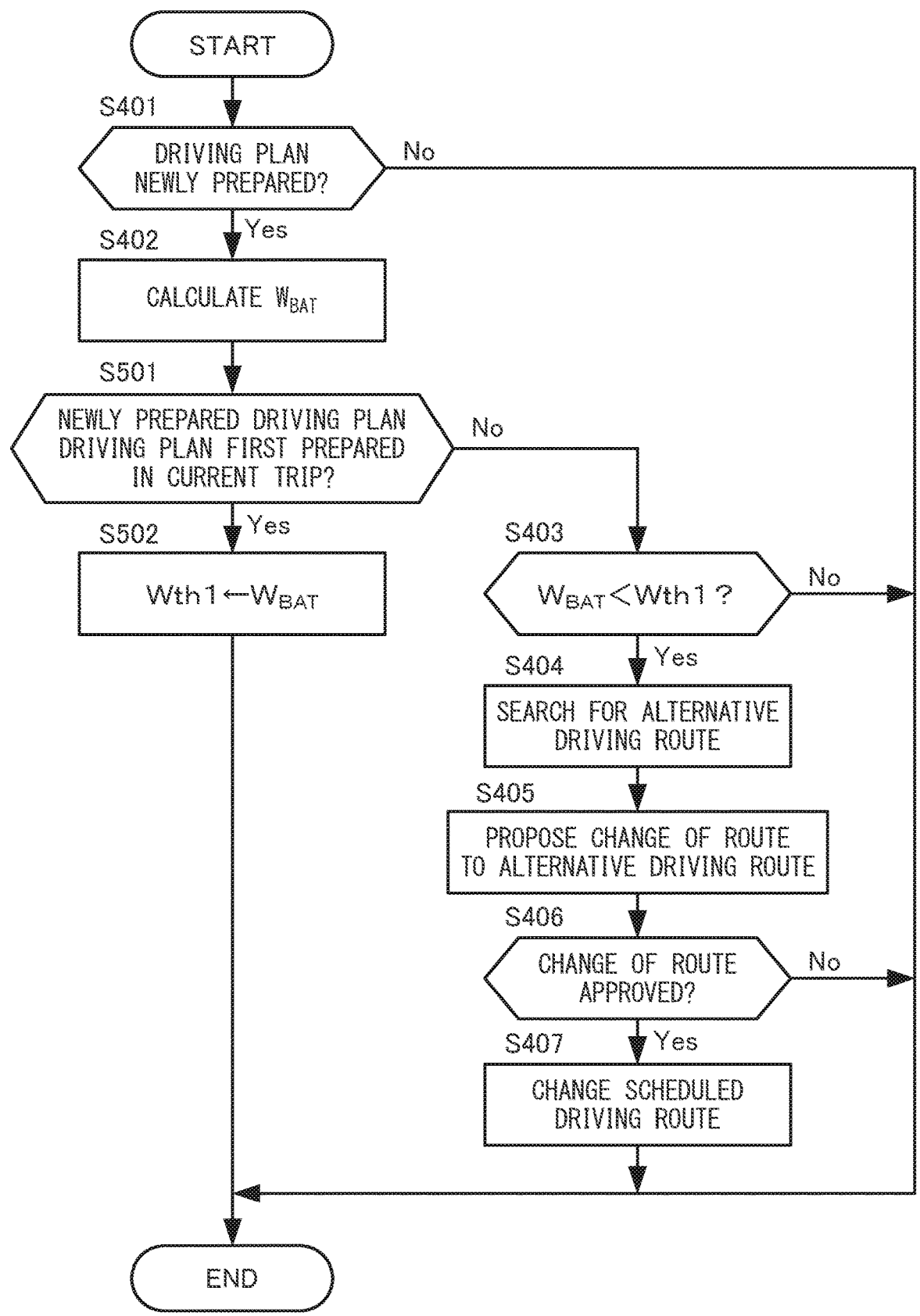
FIG. 14 is a flow chart explaining control for searching for an alternative driving route according to a fifth embodiment of the present disclosure.

FIG. 14 is a flow chart explaining control for searching for an alternative driving route according to the present embodiment. The contents of processing of steps S401 to S407 of FIG. 14 are similar to the fourth embodiment, so here the explanations will be omitted.

At step S501, the electronic control unit 20 of the vehicle 2 judges if the newly prepared driving plan is a driving plan first prepared in the current trip.

If the newly prepared driving plan is a driving plan first prepared in the current trip, the electronic control unit 20 proceeds to the processing of step S502 where it sets the estimated amount of entry battery electric power $W_{BAT}$, calculated based on the driving plan first prepared in the current trip, as the first threshold value Wth1.

On the other hand, if the newly prepared driving plan is not a driving plan first prepared in the current trip, the electronic control unit 20 proceeds to the processing of step S403 and on where it judges if the estimated amount of entry battery electric power $W_{BAT}$, calculated based on the driving plan first prepared in the current trip, is less than the first threshold value Wth1 set at step S502. Further, if the estimated amount of entry battery electric power $W_{BAT}$ is less than the first threshold value Wth1, it proposes a change of route to an alternative driving route to the vehicle occupants through the HMI device 25.

The electronic control unit 20 according to the present embodiment explained above, in the same way as the fourth embodiment, is configured to search for an alternative driving route for taking the place of the scheduled driving route if the estimated amount of entry battery electric power $W_{BAT}$ is less than a predetermined first threshold value Wth1 and set the estimated amount of entry battery electric power $W_{BAT}$ calculated when first preparing a driving plan in the current trip as the first threshold value Wth1. Even if configuring the electronic control unit 20 in this way, it is possible to obtain actions and effects corresponding to the fourth embodiment.

Sixth Embodiment

Next, a sixth embodiment of the present disclosure will be explained. The present embodiment differs from the above embodiments on the point of providing the vehicle occupants with position information of charging stations in accordance with the amount of battery electric power when actually entering a restricted region in a restricted time period. Below, this point of difference will be focused on in the explanation.

As explained above, if entering a restricted region in a restricted time period in the state where the amount of battery electric power is not sufficiently secured, in the worst case, the electric power will run out thereby rendering driving impossible. Therefore, in the present embodiment, if entering a restricted region in a restricted time period in the state where the amount of battery electric power is not sufficiently secured, it is made to provide the vehicle occupants with position information of charging stations. Below, the control for providing information according to the present embodiment will be explained.

Figure 15:
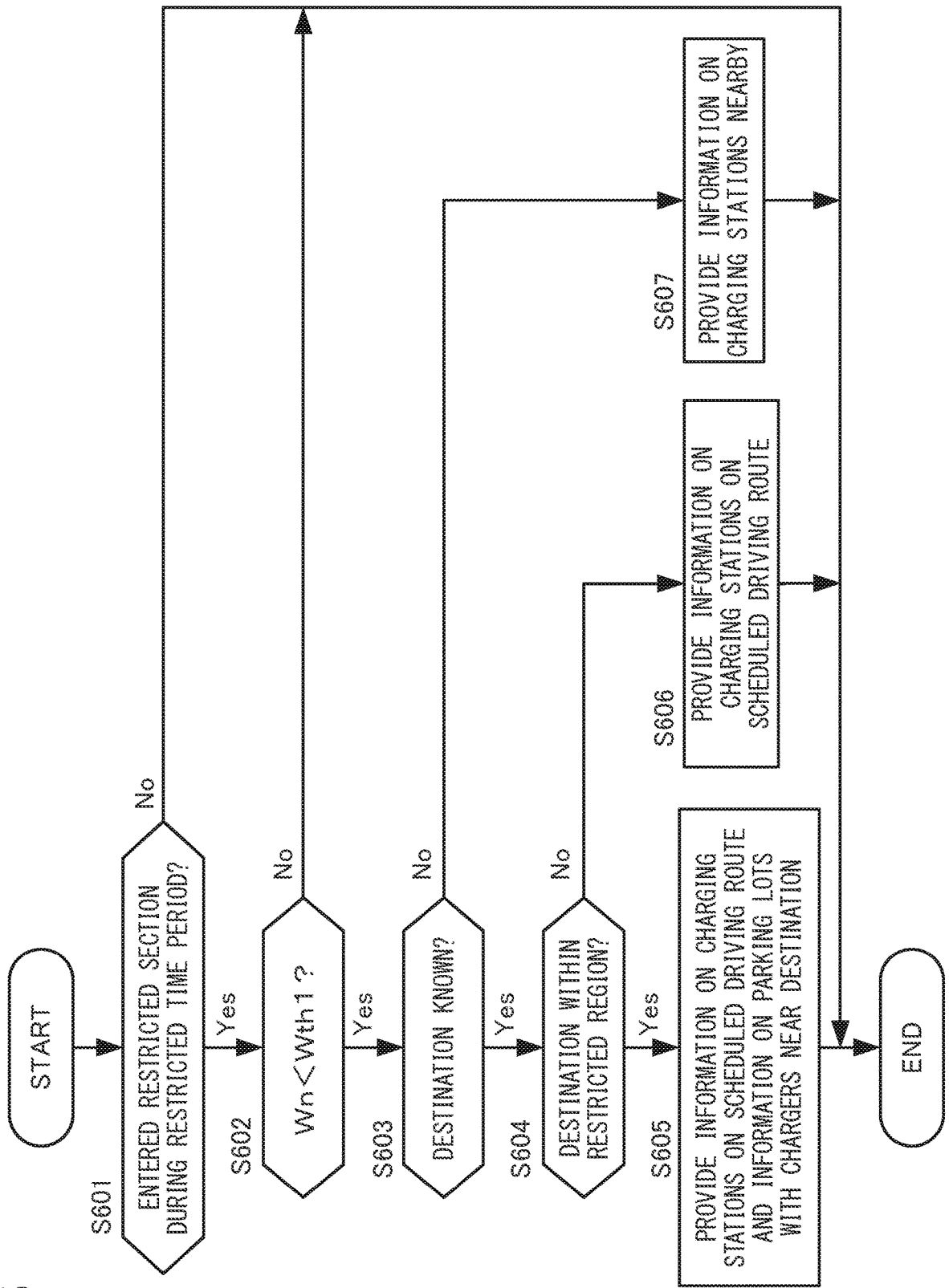
FIG. 15 is a flow chart explaining control for providing information according to a sixth embodiment of the present disclosure.

FIG. 15 is a flow chart for explaining control for providing information according to the present embodiment. The electronic control unit 20 of the vehicle 2 repeatedly performs the present routine at predetermined processing cycles.

At step S601, the electronic control unit 20 of the vehicle 2 judges if the host vehicle has entered a restricted region in a restricted time period. The method of judgment of whether the host vehicle has entered a restricted region in a restricted time period is not particularly limited. For example, it is possible to judge this based on the current position information, map information, and restricted region information. If the host vehicle enters a restricted region in a restricted time period, the electronic control unit 20 proceeds to the processing of step S602. On the other hand, if the host vehicle does not enter a restricted region in a restricted time period, the electronic control unit 20 ends the current processing.

At step S602, the electronic control unit 20 of the vehicle 2 judges if the current amount of battery electric power Wn is less than the first threshold value Wth1. If the amount of battery electric power Wn is less than the first threshold value Wth1, the electronic control unit 20 proceeds to the processing of step S603. On the other hand, if the amount of battery electric power Wn is greater than or equal to the first threshold value Wth1, the electronic control unit 20 judges the minimum extent of the amount of battery electric power required for entry into the restricted region in a restricted time period has been secured and ends the current processing.

At step S603, the electronic control unit 20 of the vehicle 2 judges if the destination of the host vehicle is known. If the destination of the host vehicle is known, the electronic control unit 20 proceeds to the processing of step S604. On the other hand, if the destination of the host vehicle is not known, the electronic control unit 20 proceeds to the processing of step S607.

At step S604, the electronic control unit 20 of the vehicle 2 judges if the destination is present inside a restricted region. If the destination is present inside a restricted region, the electronic control unit 20 proceeds to the processing of step S605. On the other hand, if the destination is not present inside a restricted region, the electronic control unit 20 proceeds to the processing of step S606.

At step S605, the electronic control unit 20 of the vehicle 2 provides position information on nearby charging stations present on the scheduled driving route and position information on parking lots with chargers present near the destination through the HMI device 25 to the vehicle occupants.

At step S606, the electronic control unit 20 of the vehicle 2 provides position information on nearby charging stations present on the scheduled driving route through the HMI device 25 to the vehicle occupants.

At step S607, the electronic control unit 20 of the vehicle 2 provides position information on nearby charging stations through the HMI device 25 to the vehicle occupants.

Note that in the present embodiment, in this way, the position information on charging stations or the position information of parking lots with chargers was provided to the vehicle occupants, but, for example, when the vehicle 2 is an automated driving vehicle able to autonomously run, it is also possible to automatically switch the destination to the nearest charging station or parking lot with a charger and make the vehicle 2 head to the switched destination.

If the amount of battery electric power Wn when entering a restricted region in a restricted time period is less than a predetermined first threshold value Wth1, the electronic control unit 20 according to the present embodiment explained above is configured to search for possible charging locations at which the battery 215 can be charged and, when the destination is inside a restricted region, provide the occupants of the vehicle 2 with at least position information of possible charging locations near the destination or change the destination to a possible charging location near the destination.

Due to this, even when entering a restricted region in a restricted time period in the state where the amount of battery electric power is not sufficiently secured, it is possible to keep from falling in a situation where the electric power runs out thereby rendering driving impossible.

Seventh Embodiment

Next, a seventh embodiment of the present disclosure will be explained.

If for example an event is held in a region where operation of internal combustion engines is not restricted, an accident occurs, etc., that region might conceivably be set as a restricted region temporarily or abruptly for a limited time period. If such a temporary restricted region is established, operation of the internal combustion engine 211 of the vehicle 2 which had been running inside a temporary restricted region might end up unexpectedly restricted. Further, inside the temporary restricted region, there is a high possibility of traffic restrictions being put into place or vehicles flowing in and congestion being caused. For this reason, if passing through a temporary restricted region to head toward a destination, a vehicle is liable to be entangled in the congestion. In the worst case, electric power is liable to run out thereby rendering driving impossible.

Therefore, in the present embodiment, if turning out to run through a temporary restricted region, it is made possible to prompt the vehicle to escape from the temporary driving region and again prepare a driving plan to the destination after escaping to the outside of the temporary restricted region.

Figure 16:
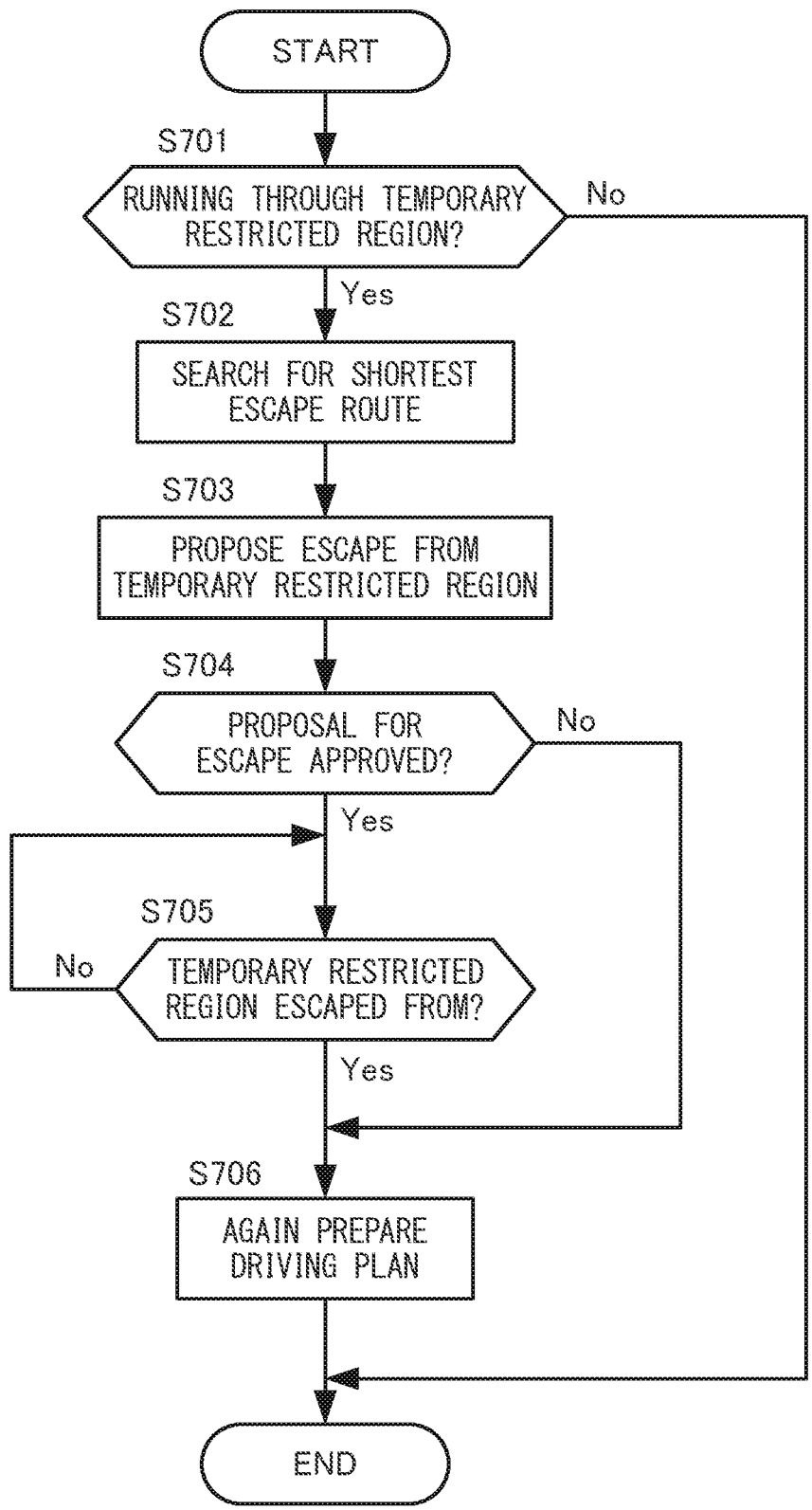
FIG. 16 is a flow chart explaining control for escaping from a temporary restricted region according to a seventh embodiment of the present disclosure.

FIG. 16 is a flow chart for explaining control for escape from a temporary restricted region according to the present embodiment.

At step S701, the electronic control unit 20 of the vehicle 2, for example, communicates with the server 1 to acquire restricted region information and judges if the host vehicle is running inside a temporary restricted region based on the current position information. If if the host vehicle is running inside a temporary restricted region, the electronic control unit 20 proceeds to the processing of step S702. On the other hand, if the host vehicle is not running inside a temporary restricted region, the electronic control unit 20 ends the current processing.

At step S702, the electronic control unit 20 of the vehicle 2 searches for the shortest escape route by which it is possible to escape from the current position to outside the temporary restricted region based on the current position information and map information.

At step S703, the electronic control unit 20 of the vehicle 2 proposes escape from the temporary restricted region to the vehicle occupants through the HMI device 25.

At step S704, the electronic control unit 20 of the vehicle 2 judges if escape from the temporary restricted region has been approved by a vehicle occupant. In the present embodiment, the electronic control unit 20 judges that escape from the temporary restricted region has been approved by a vehicle occupant when a vehicle occupant indicates his or her intent of approval through the HMI device 25 before a predetermined time has elapsed after proposing escape from the temporary restricted region. When judging that escape from the temporary restricted region has been approved by a vehicle occupant, the electronic control unit 20 proceeds to the processing of step S705. On the other hand, when it is judged that escape from the temporary restricted region has not been approved by a vehicle occupant, the electronic control unit 20 proceeds to the processing of step S706 where it prepares a driving plan optimizing the driving route from the current position to the destination after considering the temporary restricted region.

At step S705, the electronic control unit 20 of the vehicle 2 judges if the host vehicle has escaped from the temporary restricted region based on the current position information. If the host vehicle has escaped from the temporary restricted region, the electronic control unit 20 proceeds to the processing of step S706. On the other hand, if the host vehicle has not escaped from the temporary restricted region, the electronic control unit 20 waits for a predetermined interval and again performs the processing of step S705.

At step S706, the electronic control unit 20 of the vehicle 2 prepares a driving plan optimizing the driving route from the current position (point of escape) to the destination considering the temporary restricted region.

Note that in the present embodiment, in this way, the shortest escape route was searched for and escape from the temporary restricted region was proposed to the vehicle occupants, but for example if the vehicle 2 is an automated driving vehicle able to autonomously run, it is also possible to make the vehicle automatically run over the shortest escape route to make it escape from the temporary restricted region.

The electronic control unit 20 according to the present embodiment explained above is configured so as to search for the shortest escape route enabling escape from the temporary restricted region when, while driving through a point where operation of internal combustion engines 211 is not restricted, that point becomes inside a temporary restricted region where operation of internal combustion engines 211 is restricted temporarily or abruptly.

Due to this, if a temporary restricted region is established, it is possible to propose a shortest escape route to the vehicle occupants and prompt early escape from the temporary restricted region or, further, if the vehicle 2 is an automated driving vehicle able to autonomously run, possible to automatically run along the shortest escape route to escape from the temporary restricted region early. Further, after escaping from the temporary restricted region, it is possible to prepare a driving plan optimizing the driving route from the escape point to the destination.

Eighth Embodiment

Next, an eighth embodiment of the present disclosure will be explained. The present embodiment differs from the above embodiments in the configuration of the internal combustion engine 211. Below, this point of difference will be focused on in the explanation.

The internal combustion engine 211 according to the present embodiment is configured to be able to burn hydrogen fuel at part of the cylinders and to burn gasoline fuel (fossil fuel) at the remaining cylinders. Due to this, when burning only hydrogen fuel to operate the internal combustion engine 211, the amount of exhaust of carbon dioxide from the internal combustion engine 211 becomes zero. Therefore, if the restricted region is set with the object of prevention of global warming, even inside a restricted region in a restricted time period, burning only hydrogen fuel to operate the internal combustion engine 211 is allowed.

Here, even if driving according to the driving plan, the amount of battery electric power will not necessarily be managed as planned. When running through the inside of a restricted region in a restricted time period in the EV mode, the amount of battery electric power may greatly fall contrary to expectations. As a result, inside a restricted region, the amount of battery electric power may become insufficient and the electric power may run out thereby rendering driving impossible.

Therefore, in the present embodiment, assuming a restricted region being set for the purpose of prevention of global warming, it is made so that if driving through the inside of a restricted region in a restricted time period in the EV mode in accordance with a driving plan, when the amount of battery electric power Wn has become less than a predetermined second threshold value Wth2, only hydrogen fuel is burned to operate the internal combustion engine 211. Due to this, it is possible to run the vehicle 2 by the drive power of the internal combustion engine 211 and, further, possible to generate electric power by regenerative operation of the first rotating electric machine 213. For this reason, when running through the inside of a restricted region in the EV mode in accordance with the driving plan, even if the amount of battery electric power greatly drops contrary to projections, it is possible to keep from falling in a situation where driving becomes impossible. The second threshold value Wth2 is made an amount of electric power of an extent, for example, enabling driving from the center part of the restricted region to the boundary.

Figure 17:
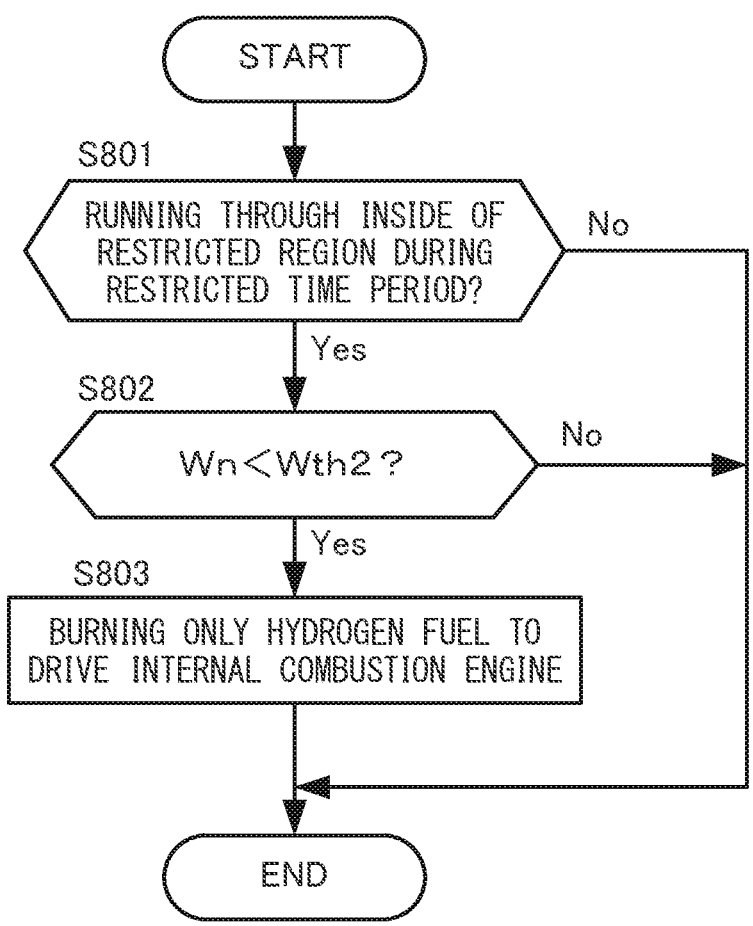
FIG. 17 is a flow chart explaining control for operating an internal combustion engine according to an eighth embodiment of the present disclosure.

FIG. 17 is a flow chart explaining control for operating the internal combustion engine 211 according to the present embodiment.

At step S801, the electronic control unit 20 of the vehicle 2 judges if the host vehicle is running inside a restricted region in a restricted time period. If the host vehicle is running inside a restricted region during a restricted time period, the electronic control unit 20 proceeds to the processing of step S802. On the other hand, if the host vehicle is not running inside a restricted region during a restricted time period, the electronic control unit 20 ends the current processing.

At step S802, the electronic control unit 20 of the vehicle 2 judges if the current amount of battery electric power Wn is less than the second threshold value Wth2. If the current amount of battery electric power Wn is less than the second threshold value Wth2, the electronic control unit 20 proceeds to the processing of step S803. On the other hand, if the current amount of battery electric power Wn is greater than or equal to the second threshold value Wth2, the electronic control unit 20 ends the current processing.

At step S803, the electronic control unit 20 of the vehicle 2 burns only hydrogen fuel to operate the internal combustion engine 211.

According to the present embodiment explained above, the internal combustion engine 211 is configured to enable hydrogen fuel to be burned at part of the cylinders and gasoline fuel (fossil fuel) to be burned at the remaining cylinders. Further, the electronic control unit 20 according to the present embodiment is configured so that if driving through the inside of a restricted region in a restricted time period in the EV mode, when the amount of battery electric power Wn becomes less than the second threshold value Wth2, only hydrogen fuel is burned to operate the internal combustion engine 211 to make the vehicle 2 run by the drive power of the internal combustion engine 211 or the electric power generated utilizing the drive power of the internal combustion engine 211 is charged to the battery 215.

Due to this, when running through the inside of a restricted region in an EV mode in a restricted time period in accordance with a driving plan, even if the amount of battery electric power greatly falls contrary to projections, it is possible to keep from falling in a situation where driving becomes impossible.

Ninth Embodiment

Next, a ninth embodiment of the present disclosure will be explained. The present embodiment differs from the above embodiments on the point that the vehicle 2 is not a hybrid vehicle provided with an internal combustion engine and a motor as sources of drive power, but a normal vehicle provided with only an internal combustion engine as a source of drive power. Below, this point of difference will be focused on in the explanation.

Figure 18:
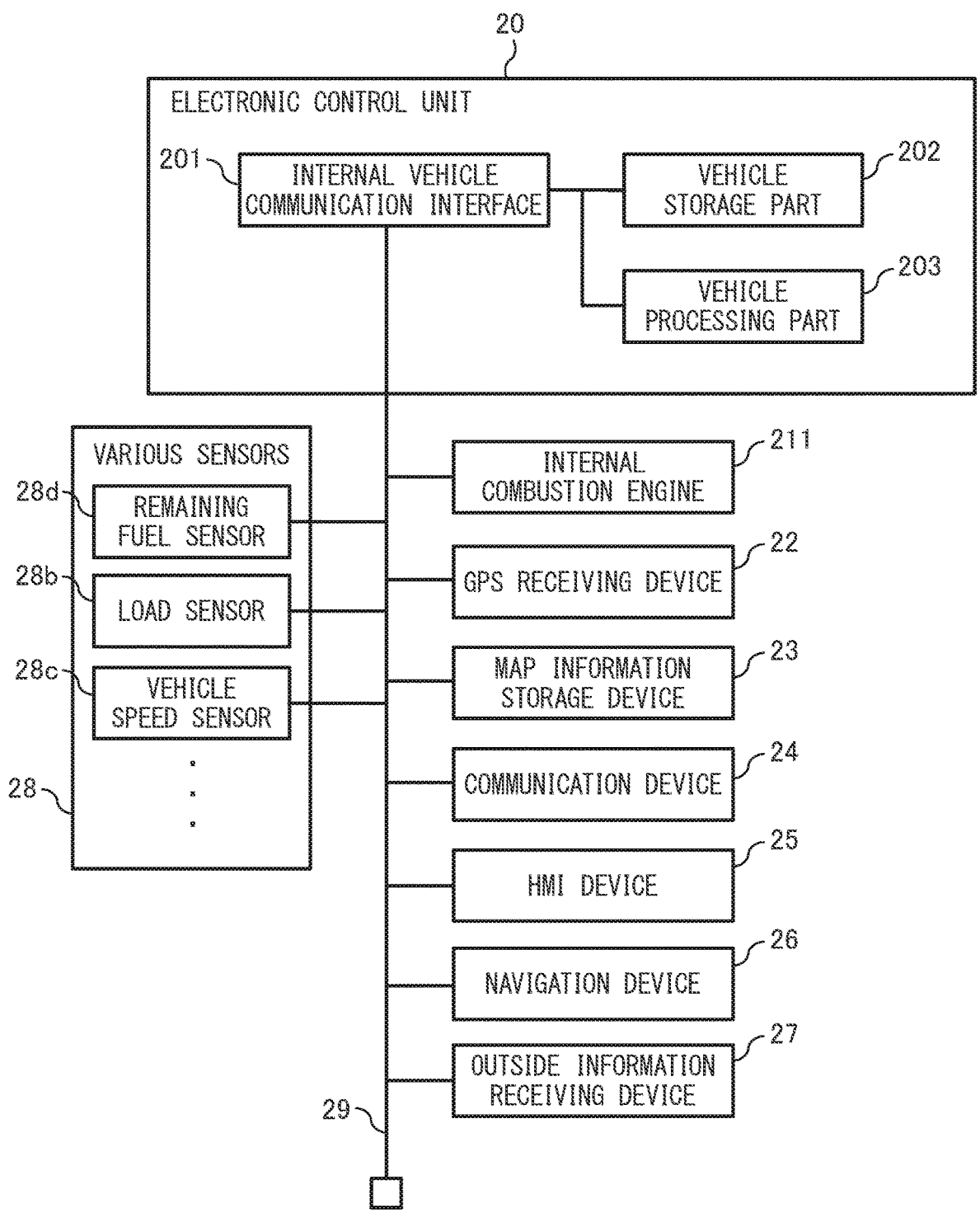
FIG. 18 is a schematic view of the configuration according to a ninth embodiment of the present disclosure.

FIG. 18 is a schematic view of the configuration of the vehicle 2 according to the present embodiment.

As shown in FIG. 18, the vehicle 2 according to the present embodiment is a normal vehicle provided with only an internal combustion engine 211 as the source of drive power and is configured to be able to transmit the drive power of the internal combustion engine 211 to the driving wheels. The internal combustion engine 211 is configured to be able to burn hydrogen fuel in part of the cylinders and burn gasoline fuel (fossil fuel) in the remaining cylinders. The vehicle 2 is provided with a remaining fuel amount sensor 28d detecting the remaining amount of fuel.

The electronic control unit 20 according to the present embodiment is configured to be able to switch the driving mode of the vehicle 2 to either of the hydrogen mode or the gasoline mode. The hydrogen mode is a mode burning only hydrogen fuel to drive the internal combustion engine 211. The gasoline mode is a mode burning at least gasoline fuel to drive the internal combustion engine 211.

Further, the electronic control unit 20 prepares a driving plan regarding which driving sections on the scheduled driving route to run through in a hydrogen mode and which driving sections to run through in a gasoline mode while considering restricted regions and make the vehicle 2 run while switching the driving mode in accordance with the driving plan.

Figure 19A:
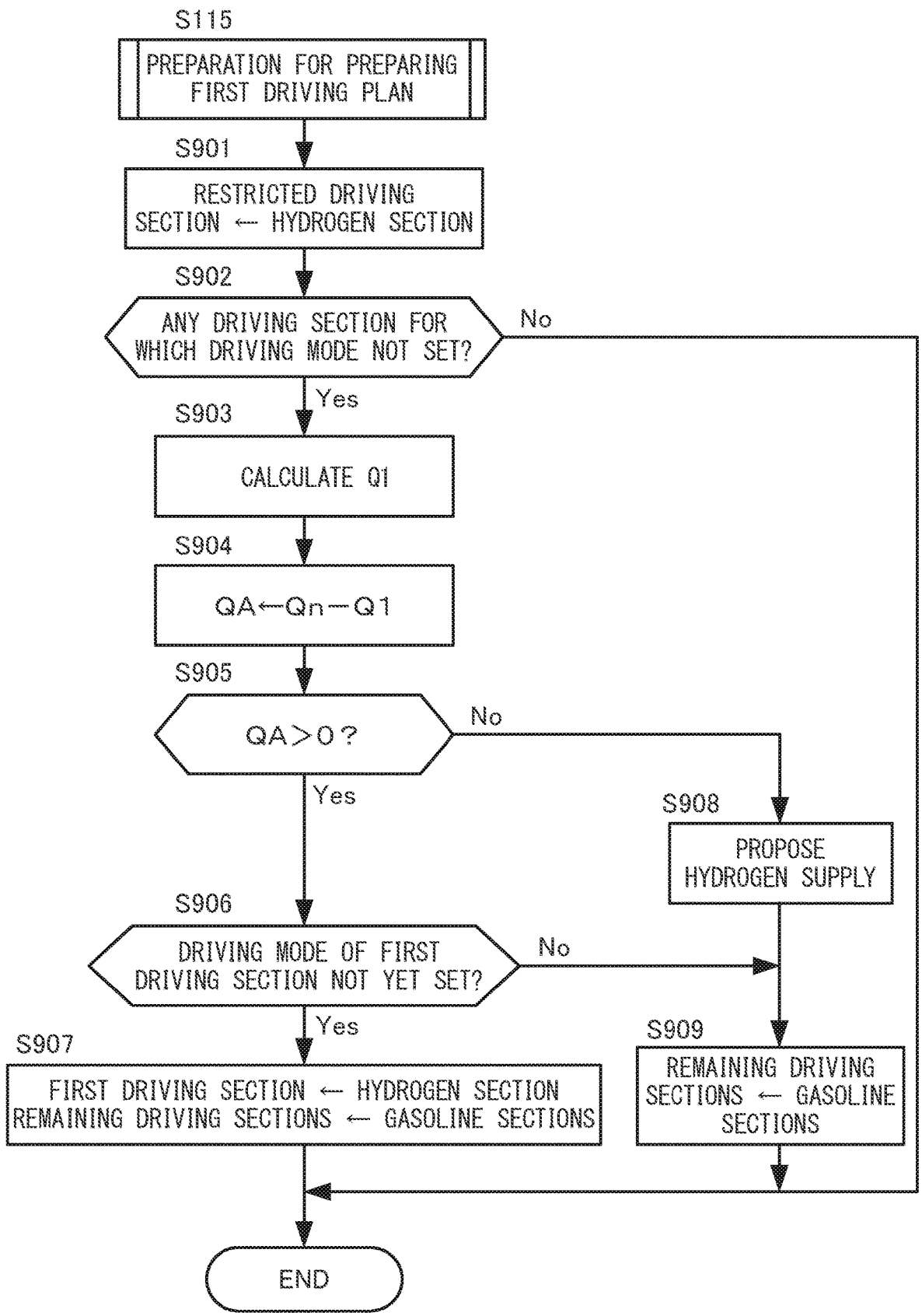
FIG. 19A is a flow chart explaining processing for preparation of a first driving plan according to a ninth embodiment of the present disclosure.

FIG. 19A is a flow chart explaining details of the processing for preparation of a first driving plan according to the present embodiment.

At step S901, the electronic control unit 20 of the vehicle 2 sets the restricted driving sections as hydrogen sections for running in the hydrogen mode.

At step S902, the electronic control unit 20 of the vehicle 2 judges if there is any drive section for which the driving mode has not been set. If there is a driving section for which the driving mode has not been set, the electronic control unit 20 proceeds to the processing of step S903. On the other hand, if there is no driving section for which the driving mode has not been set, the electronic control unit 20 ends the preparation of the first driving plan.

At step S903, the electronic control unit 20 of the vehicle 2 calculates the estimated value Q1[L] of the hydrogen fuel consumed when driving through all of the restricted driving sections in the hydrogen mode based on the driving loads of the restricted driving sections (below, referred to as the "estimated amount of fuel consumption").

At step S904, the electronic control unit 20 of the vehicle 2 calculates the amount of hydrogen fuel QA[L] able to be used in the remaining sections other than the restricted driving sections in the current amount of hydrogen fuel Qn detected by the remaining fuel amount sensor 28d (below, referred to as the "amount of available hydrogen fuel"). In the present embodiment, the electronic control unit 20 calculates the remaining amount of hydrogen fuel obtained by subtracting from the current amount of hydrogen fuel Qn the estimated amount of fuel consumption Q1 as the amount of available hydrogen fuel QA.

At step S905, the electronic control unit 20 of the vehicle 2 judges if the amount of available hydrogen fuel QA is greater than zero. If the amount of available hydrogen fuel QA is greater than zero, the electronic control unit 20 proceeds to the processing of step S906. On the other hand, if the amount of available hydrogen fuel QA is less than or equal to zero, the electronic control unit 20 proceeds to the processing of step S908.

At step S906, the electronic control unit 20 of the vehicle 2 judges if the driving mode of the first driving section in which the vehicle first runs on the scheduled driving route (that is, the driving section including the starting point) has not yet been set. If the driving mode of the first driving section has not yet been set, the electronic control unit 20 proceeds to the processing of step S907. On the other hand, if the driving mode of the first driving section has already been set, the electronic control unit 20 proceeds to the processing of step S909.

At step S907, the electronic control unit 20 of the vehicle 2 sets the first driving section as a hydrogen section and sets all of the remaining driving sections as gasoline sections.

In this way, the first driving section is set as a hydrogen section for the following reason. That is, if driving the internal combustion engine 211 by burning gasoline fuel, which is liquid fuel at the time of a cold state before the internal combustion engine 211 has finished warming up, the exhaust emission tends to deteriorate due to the effect of the gasoline fuel adhering to the cylinder wall surfaces. Therefore, by setting the first driving section as a hydrogen section, at the time of a cold state of the internal combustion engine 211, it is possible to operate the internal combustion engine 211 by burning the gaseous hydrogen fuel and as a result it is possible to keep the exhaust emission from deteriorating.

At step S908, hydrogen fuel becomes insufficient for driving through the restricted driving section in the hydrogen mode, so the electronic control unit 20 of the vehicle 2 proposes the resupply of hydrogen fuel to the vehicle occupants through the HMI device 25.

At step S909, the electronic control unit 20 of the vehicle 2 sets all of the remaining driving sections as gasoline sections.

FIG. 19B is a flow chart explaining details of the processing for preparation of a second driving plan according to the present embodiment. Note that in FIG. 19B, the contents of the processing of steps S905 to S909 are similar to the contents of the above-mentioned processing explained above with reference to FIG. 19A, so here the processing will be omitted.

At step S911, the electronic control unit 20 of the vehicle 2 calculates the current amount of hydrogen fuel Qn detected by the remaining fuel amount sensor 28d as the amount of available hydrogen fuel QA.

Note that in the present embodiment, a driving plan enabling running in the restricted driving section and the first driving section in the hydrogen mode was prepared, but a driving plan setting other driving sections to the hydrogen mode in addition to these driving sections in accordance with the remaining amount of hydrogen may also be prepared.

According to the present embodiment explained above, the electronic control unit 20 (vehicle control device) for controlling a vehicle 2 equipped with an internal combustion engine 211 configured to be able to burn hydrogen fuel in part of the cylinders and able to burn a fossil fuel in the remaining cylinders is provided with a driving plan preparation part for preparing a driving plan dividing a scheduled driving route up to a destination of the vehicle 2 into a plurality of driving sections and setting which driving mode the driving sections should be driven in between a hydrogen mode (first mode) driving by burning only hydrogen fuel or a gasoline mode (second mode) driving by burning at least fossil fuel and a drive power control part for controlling the internal combustion engine 211 based on the driving plan.

Further, the driving plan preparation part is configured so that, when driving sections are present inside a restricted region, it extracts as a restricted driving section from among driving sections present inside the restricted region a driving section through which it is projected that the vehicle 2 will be driven in a restricted time period in which burning fossil fuel to operate the internal combustion engine 211 is restricted and prepares a driving plan able to drive through the restricted driving section in the hydrogen mode.

Due to this, it is possible to prepare a suitable driving plan considering restricted regions when preparing a driving plan of a vehicle 2 able to switch to driving modes of a first mode running by burning only hydrogen fuel and a second mode running by at least a fossil fuel.

Further, the electronic control unit 20 according to the present embodiment is configured to provide occupants of a vehicle 2 the position information of locations able to resupply hydrogen fuel when the remaining amount of hydrogen fuel is less than an estimated value of the amount of hydrogen fuel consumed when driving through a restricted driving section in the hydrogen mode (first mode), so it is possible to keep from falling in a situation where the remaining amount of hydrogen becomes insufficient while driving through a restricted driving section.

Above, embodiments of the present disclosure were explained, but the above embodiments only show some of the examples of application of the present disclosure and are not meant to limit the technical scope of the present disclosure to the specific constitutions of the above embodiments.

For example, in the above embodiments, a driving plan was prepared optimizing the driving in one trip from the starting point to the destination (period from when the start switch of the vehicle 2 is turned ON to when it is turned OFF), but the disclosure is not limited to this. It is also possible to prepare a driving plan optimizing the driving in a driving route as a whole comprised of several trips such as when traveling back and forth between the home and workplace or when making the rounds of a plurality of destinations (waypoints) then returning to the home or other initial starting point (in the case of the former, two trips—outbound and return and in the case of the latter, for example, if there are two destinations, three trips).

Further, in the above embodiments, the restricted region information was acquired from the server 1, but the disclosure is not limited to this. The restricted region information may be stored in advance in the vehicle storage part 202 of the electronic control unit 20 or another vehicle-mounted storage device. If a road traffic information communication system center or other outside communication center periodically sends restricted region information, it may also be acquired by receiving the restricted region information sent from the outside communication center.

The invention claimed is:

1. A vehicle control device configured to control a vehicle equipped with an internal combustion engine, a rotating electric machine, and a battery, the vehicle control device comprising:
a processor configured to:
prepare a driving plan dividing a scheduled driving route up to a destination of the vehicle into a plurality of driving sections and setting which driving mode the driving sections should be driven in between an EV mode stopping the operation of the internal combustion engine and driving by the drive power of the rotating electric machine and an HV mode running by drive power of the internal combustion engine and the drive power of the rotating electric machine; and
control the internal combustion engine and rotating electric machine based on the driving plan,
wherein the processor is configured to:
when driving sections are present inside a restricted region, extract as a restricted driving section from among driving sections present inside the restricted region a driving section through which it is projected the vehicle will be driven in a restricted time period in which operation of internal combustion engines is restricted,
prepare the driving plan able to drive through the restricted driving section in the EV mode, and
prepare the driving plan so that, if the destination is present inside the restricted region, the amount of electric power of the battery when arriving at the destination will not become less than the amount of electric power required for escaping from the destination to outside the restricted region.

2. The vehicle control device according to claim 1, wherein
the processor is configured to:
calculate the amount of electric power able to be used in the remaining driving sections other than the restricted driving section in the amount of electric power of the battery as the amount of available battery electric power; and
determine the driving modes of the remaining driving sections other than the restricted driving section based on the amount of available battery electric power.

3. The vehicle control device according to claim 2, wherein the processor is configured to:
calculate a first estimated amount of electric power of an estimated value of the amount of electric power consumed if driving through the restricted driving section in the EV mode; and
make the remaining amount of electric power, obtained by subtracting from the amount of electric power of the battery the first estimated amount of electric power, the amount of available battery electric power.

4. The vehicle control device according to claim 1, wherein
the processor is configured to prepare the driving plan setting the driving mode of the restricted driving section to the EV mode.

5. The vehicle control device according to claim 1, wherein the processor is configured to:
calculate the amount of electric power able to be used in the remaining driving sections other than the restricted driving section in the amount of electric power of the battery as the amount of available battery electric power during which it calculates a first estimated amount of electric power of an estimated value of the amount of electric power consumed if running through the restricted driving section in the EV mode and an estimated amount of escape electric power of an estimated value of the amount of electric power required for escaping from the destination to outside the restricted region;
make the remaining amount of electric power, obtained by subtracting from the amount of electric power of the battery the first estimated amount of electric power and the estimated amount of escape electric power, the amount of available battery electric power; and determine the driving modes of the remaining driving sections other than the restricted driving section based on the amount of available battery electric power.

6. A vehicle control device configured to control a vehicle equipped with an internal combustion engine, a rotating electric machine, and a battery, the vehicle control device comprising:
a processor configured to:
prepare a driving plan dividing a scheduled driving route up to a destination of the vehicle into a plurality of driving sections and setting which driving mode the driving sections should be driven in between an EV mode stopping the operation of the internal combustion engine and driving by the drive power of the rotating electric machine and an HV mode running by drive power of the internal combustion engine and the drive power of the rotating electric machine; and
control the internal combustion engine and rotating electric machine based on the driving plan,
wherein the processor is configured to:
when driving sections are present inside a restricted region, extract as a restricted driving section from among driving sections present inside the restricted region a driving section through which it is projected the vehicle will be driven in a restricted time period in which operation of internal combustion engines is restricted; and
prepare the driving plan able to drive through the restricted driving section in the EV mode, and
prepare the driving plan so that, if the destination is present inside the restricted region, when it is scheduled to charge the battery at the destination, the amount of electric power of the battery at the time of start of the next trip starting from the destination does not fall below the amount of electric power required for escaping from the destination to outside of the restricted region.

7. The vehicle control device according to claim 6, wherein the processor is configured to:
calculate the amount of electric power able to be used in the remaining driving sections other than the restricted driving section in the amount of electric power of the battery as the amount of available battery electric power during which it calculates a first estimated amount of electric power of an estimated value of the amount of electric power consumed if running through the restricted driving section in the EV mode, an estimated amount of escape electric power of an estimated value of the amount of electric power required for escaping from the destination to outside the restricted region, and an estimated amount of charged electric power of an estimated value of electric power charged at the destination;
make the remaining amount of electric power, obtained by subtracting from the amount of electric power of the battery the first estimated amount of electric power, the amount of available battery electric power if the estimated amount of charged electric power is greater than or equal to the estimated amount of escape electric power; and
make the remaining amount of electric power, obtained by subtracting from the amount of electric power of the battery the first estimated amount of electric power and the difference between the estimated amount of escape electric power and the estimated amount of charged electric power, the amount of available battery electric power if the estimated amount of charged electric power is less than the estimated amount of escape electric power; and
determine the driving modes of the remaining driving sections other than the restricted driving section based on the amount of available battery electric power.

8. The vehicle control device according to claim 1, wherein
the processor is configured to set a driving section where the driving load will become greater than or equal to a predetermined load among the driving sections where the driving mode is set to the HV mode as a charging section for charging the battery utilizing the drive power of the internal combustion engine.

9. The vehicle control device according to claim 1, wherein
the processor is configured to:
calculate an estimated amount of entry battery electric power when entering the restricted region projected if driving through the scheduled driving route in accordance with the driving plan, and
if the estimated amount of entry battery electric power is less than a predetermined threshold value, search for an alternative driving route taking the place of the scheduled driving route so as to automatically change the scheduled driving route or propose a change of the scheduled driving route to the vehicle occupants.

10. The vehicle control device according to claim 9, wherein
the alternative driving route is a driving route where an increase in an estimated amount of battery electric power is expected compared with the scheduled driving route.

11. The vehicle control device according to claim 9, wherein
the alternative driving route is a driving route where a shortening of the distance of running in the EV mode is expected compared with the scheduled driving route among a plurality of driving routes from the current position until entry into the restricted region.

12. The vehicle control device according to claim 9, wherein
the alternative driving route is a driving route where an increase in amount of regenerated electric power from the scheduled driving route is expected among a plurality of driving routes from the current position until entry into the restricted region.

13. The vehicle control device according to claim 9, wherein the processor is configured to:
set the estimated amount of entry battery electric power calculated when first preparing a driving plan in the current trip as a threshold value.

14. The vehicle control device according to claim 9, wherein
the processor is configured to:
set the threshold value based on an amount of electric power of the battery when entering the restricted region collected and stored from one or more vehicles.

15. The vehicle control device according to claim 9, wherein
the battery is configured to be able to store electric power generated utilizing sunlight, and
the processor is configured to, if weather around the restricted region is foggy or rain, set the threshold value to a higher value compared when it is clear.

16. The vehicle control device according to claim 9, wherein the processor is configured to, when humidity around the restricted region is high, set the threshold value to a higher value compared to when it is low.

17. The vehicle control device according to claim 1, wherein the processor is configured to:

search for possible charging locations able to charge the battery if the amount of electric power of the battery when entering the restricted region during a restricted time period is less than a predetermined threshold value, and when the destination is inside the restricted region, provide occupants of the vehicle with at least position information of possible charging locations near the destination or changes the destination to a possible charging location near the destination.

18. The vehicle control device according to claim 1, wherein the processor is configured to:

search for a shortest escape route enabling escape from a temporary restricted region when, while driving through a point where operation of internal combustion engines is not restricted, that point becomes inside a temporary restricted region where operation of internal combustion engines is restricted temporarily or abruptly.

19. The vehicle control device according to claim 1, wherein the internal combustion engine is configured to be able to burn hydrogen fuel in part of the cylinders and burn a fossil fuel in the remaining cylinders, and if driving through the inside of the restricted region in a restricted time period in the EV mode, when the amount of battery electric power becomes less than a predetermined threshold value, only hydrogen fuel is burned to operate the internal combustion engine to make the vehicle run by the drive power of the internal combustion engine or the electric power generated utilizing the drive power of the internal combustion engine is charged to the battery.

20. A vehicle control method for controlling a vehicle equipped with an internal combustion engine, a rotating electric machine, and a battery, the vehicle control method comprising:

a step of dividing a scheduled driving route up to a destination of the vehicle into a plurality of driving sections and setting which driving mode the driving sections should be driven in between an EV mode stopping the operation of the internal combustion engine and driving by the drive power of the rotating electric machine and an HV mode running by drive power of the internal combustion engine and the drive power of the rotating electric machine, wherein the step further includes:

judging if driving sections are present inside a restricted region;

when driving sections are present inside the restricted region, extracting as a restricted driving section from among driving sections present inside the restricted region a driving section through which it is projected the vehicle will be driven in a restricted time period in which operation of internal combustion engines is restricted; and setting the driving mode of the restricted driving section to the EV mode, preparing a driving plan so that, if the destination is present inside the restricted region, the amount of electric power of the battery when arriving at the destination will not become less than the amount of electric power required for escaping from the destination to outside the restricted region, and preparing the driving plan so that, if the destination is present inside the restricted region, when it is scheduled to charge the battery at the destination, the amount of electric power of the battery at the time of start of the next trip starting from the destination does not fall below the amount of electric power required for escaping from the destination to outside of the restricted region.

* * * * *